United States Patent
Urzhumov

(10) Patent No.: US 11,600,258 B2
(45) Date of Patent: *Mar. 7, 2023

(54) SYSTEMS AND METHODS FOR ACOUSTIC MODE CONVERSION

(71) Applicant: Elwha LLC, Bellevue, WA (US)

(72) Inventor: Yaroslav A. Urzhumov, Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 428 days.

This patent is subject to a terminal disclaimer.

(21) Appl. No.: 16/827,502

(22) Filed: Mar. 23, 2020

(65) Prior Publication Data

US 2020/0273445 A1 Aug. 27, 2020

Related U.S. Application Data

(63) Continuation of application No. 15/599,342, filed on May 18, 2017, now Pat. No. 10,600,402.

(51) Int. Cl.
  *G10K 11/34* (2006.01)
  *G01S 15/89* (2006.01)
  *G03H 3/00* (2006.01)

(52) U.S. Cl.
  CPC .......... *G10K 11/341* (2013.01); *G01S 15/897* (2013.01); *G03H 3/00* (2013.01)

(58) Field of Classification Search
  CPC ....... G10K 11/341; G01S 15/897; G03H 3/00
  See application file for complete search history.

(56) References Cited

U.S. PATENT DOCUMENTS

| | | |
|---|---|---|
| 3,922,622 A | 11/1975 | Boyd et al. |
| 5,148,134 A | 9/1992 | Krill et al. |
| 5,942,956 A | 8/1999 | Haq et al. |
| 6,147,569 A | 11/2000 | Kishino et al. |
| 6,624,077 B2 | 9/2003 | White |

(Continued)

FOREIGN PATENT DOCUMENTS

JP 2013244202 A 12/2013

OTHER PUBLICATIONS

Cummer, S., Christensen, J. & Alu, A. Controlling sound with acoustic metamaterials. Nat Rev Mater 1, 16001 (2016). https://doi.org/10.1038/natrevmats.2016.1 (Year: 2016).*

(Continued)

*Primary Examiner* — Ian J Lobo

(57) ABSTRACT

The present disclosure provides systems and methods associated with mode conversion for ultrasound and acoustic radiation devices. A method is disclosed for manufacturing a mode converting structure comprising a holographic metamaterial that, when positioned relative to an acoustic radiation device (AR), modifies an acoustic field profile of the AR device from an input mode to an output mode, the method including identifying a volumetric distribution of acoustic material properties within the mode converting structure to transform an input pressure field distribution of acoustic radiation in the input mode to an output field distribution of acoustic radiation that approximates the target radiation pattern in the output mode and manufacturing the mode converting structure using the identified volumetric distribution of acoustic material properties.

44 Claims, 23 Drawing Sheets
(10 of 23 Drawing Sheet(s) Filed in Color)

(56) References Cited

U.S. PATENT DOCUMENTS

| | | |
|---|---|---|
| 6,794,950 B2 | 9/2004 | du Tait et al. |
| 7,019,603 B2 | 3/2006 | Yoneda et al. |
| 7,750,762 B2 | 7/2010 | Okano |
| 9,515,363 B2 | 12/2016 | Herbsommer |
| 9,570,812 B2 | 2/2017 | Driscoll et al. |
| 9,711,831 B2 | 7/2017 | Driscoll et al. |
| 2003/0199765 A1 | 10/2003 | Stetten et al. |
| 2005/0273009 A1 | 12/2005 | Deischinger et al. |
| 2010/0265014 A1 | 10/2010 | Bowers et al. |
| 2013/0025961 A1 | 1/2013 | Koh et al. |
| 2013/0079641 A1 | 3/2013 | Zwirn |
| 2015/0022287 A1 | 1/2015 | Jannotta et al. |
| 2015/0222021 A1 | 8/2015 | Stevenson |
| 2015/0228269 A1 | 8/2015 | Semperlotti et al. |
| 2016/0327745 A1 | 11/2016 | Driscoll et al. |

OTHER PUBLICATIONS

Xie et al., "Acoustic Holographic Rendering with Two-Dimensional Metamaterial-based Passive Phased Array", Scientific Reports 6, Article No. 35437 (Year: 2016).

PCT International Search Report; International App. No. PCT/US2016/020915; dated Jul. 11, 2016; pp. 1-2.

Driscoll et al., Performance of a three dimensional transformation-optical-flattened Luneburg lens, Optics Express, Jun. 4, 2012, vol. 20 No. 12, Optical Society of America.

Larouche et al., Nanotube holograms, Nature, Nov. 1, 2012, pp. 47-48, vol. 491, Macmillan Publishers Limited.

Landy et al., A full-parameter unidirectional metamaterial cloak for microwaves, Nature Materials, Nov. 11, 2012. pp. 1-4, Macmillan Publishers Limited.

Hunt et al, Broadband Wide Angle Lens Implemented with Dielectric Metamaterials, www.mdpi.com/journal/sensors, Aug. 12, 2011, pp. 7982-7991.

Larouche et al., Infrared metamaterial phase holograms, Nature Materials, Mar. 18, 2012, pp. 450-454, vol. 11.

Hunt et al., Planar, flattened Luneburg lens at infrared wavelengths, Optics Express, Jan. 16, 2012, pp. 1706-1713, vol. 20 No. 2, Optical Society of America.

Urzhumov et al., Thin low-loss dielectric coatings for free-space cloaking, Optics Letters, May 15, 2013, pp. 1606-1608, vol. 38 No. 10, Optical Society of America.

Urzhumov et al., Low-loss directional cloaks without superluminal velocity or magnetic response, Optics Letters, Nov. 1, 2012, pp. 44 71-44 73, vol. 37 No. 21, Optical Society of America.

Ni et al., Metasurface holograms for visible light, Nature Communications, Nov. 15, 2013, pp. 1-6, Macmillan Publishers Limited.

Leon-Saval et al., Mode-selective photonic lanterns for space-division multiplexing, Optics Express, Jan. 13, 2014, pp. 1-9, vol. 22 No. 1, Optical Society of America.

Lalau-Keraly et al., Adjoint shape optimization applied to electromagnetic design, Optics Express, Sep. 9, 2013, pp. 21693-21701, vol. 21 No. 18. Optical Society of America.

Lin et al., Nanostructured Holograms for Broadband Manipulation of Vector Beams, Nano Letters, Aug. 5, 2013, pp. 4269-4274, American Chemical Society.

Jin et al., Advances in Particle Swarm Optimization for Antenna Designs: Real-Number, Binary, Single-Objective and Multiobjective Implementations, IEEE Transactions On Antennas And Propagation, Mar. 2007, pp. 556-567, vol. 55 No. 3, IEEE.

Zhu et al., Design And Optimization Of Low Res Patch Antennas Based On A Genetic Algorithm, Progress In Electromagnetics Research, 2012, pp. 327-339, vol. 122.

Met al., Design Synthesis of Metasurfaces for Broadband Hybrid-Mode Horn Antennas With Enhanced Radiation Pattern and Polarization Characteristics, IEEE Transactions On Antennas And Propagation, Aug. 2012, pp. 3594-3604, vol. 60 No. 8, IEEE.

Boeringer et al.. Efficiency-Constrained Particle Swarm Optimization of a Modified Bernstein Polynomial for Conformal Array Excitation Amplitude Synthesis, IEEE Transactions On Antennas And Propagation, Aug. 2005, pp. 2662-2673, vol. 53 No. 8, IEEE.

Yu et al., Flat optics with designer metasurfaces, Nature Materials, Jan. 23, 2014, pp. 139-150, vol. 13, Macmillan Publishers Limited.

Jensen et al., Topology optimization for nano-photonics, Laser Photonics, 2011, pp. 308-321, Rev 5 No. 2, Wiley-Vhe Verleg GmbH & Co.

Orihara et al., Optimization and application of hybrid-level binary zone plates, Applied Optics, Nov. 10, 2001, pp. 5877-5885, vol. 40 No. 32, Optical Society of America.

Seliger et al., Optimization of aperiodic dielectric structures, http://dx.dolorgP10.1063/1.2221497, August. 8, 2006, visited Aug. 11, 2014.

Toader et al., Photonic Band Gap Architectures for Holographic Lithography, Physical Review Letters, Jan. 30, 2004, pp. 1-4, vol. 92 No 4, The American Physical Society.

Sharp et al., Photonic crystals for the visible spectrum by holographic lithography, Optical and Quantum Electronics 34, 2002, pp. 3-12, Kluwer Academic Publishers.

Fong et al, Scalar and Tensor Holographic Artificial Impedance Surfaces, IEEE Transactions On Antennas And Propagation, Oct. 2010, pp. 3212-3221, vol. 58 No. 10, IEEE.

Kildishev et al., Planar Photonics with Metasurfaces, Science 339, http://www.sciencemag.org/content/339/6125/1232009.full.html, Mar. 15, 2013, visited October 8, 2014.

Saravanamuttu et al., Sol-Gel Organic-Inorganic Composites for 3-D Holographic Lithography of Photonic Crystals with Submicron Periodicity, American Chemical Society, Apr. 29, 2003, 4 pgs.

Bayraktar et al., The Design of Miniature Three-Element Stochastic Yagi-Uda Arrays Using Particle Swarm Optimization, IEEE Antennas And Wireless Propagation Letters, Nov. 22, 2005, pp. 22-26, IEEE.

Miller, Photonic Design: From Fundamental Solar Cell Physics to Computational Inverse Design, Thesis, Spring 2012, pp. 137.

Huang et al., Three-dimensional optical holography using a plasmonic metasurface, Nature Communications, Nov. 15, 2013, pp. 1-8, Macmillan Publishers Limited.

Yu et al., Topology optimization for highly-efficient light-trapping structure in solar cells, Research paper, May 10, 2014, pp. 367-382. Springer-Verlag Berlin Heidelberg 2014.

PCT International Search Report; International App. No. PCT/US2018/033450; dated Sep. 14, 2018; pp. 1-3.

Guancong Ma et al., "Acoustic metamaterials: From local resonances to broad horizons," Science Advances, 2016, vol. 2, No. 2, pp. 1-17.

\* cited by examiner

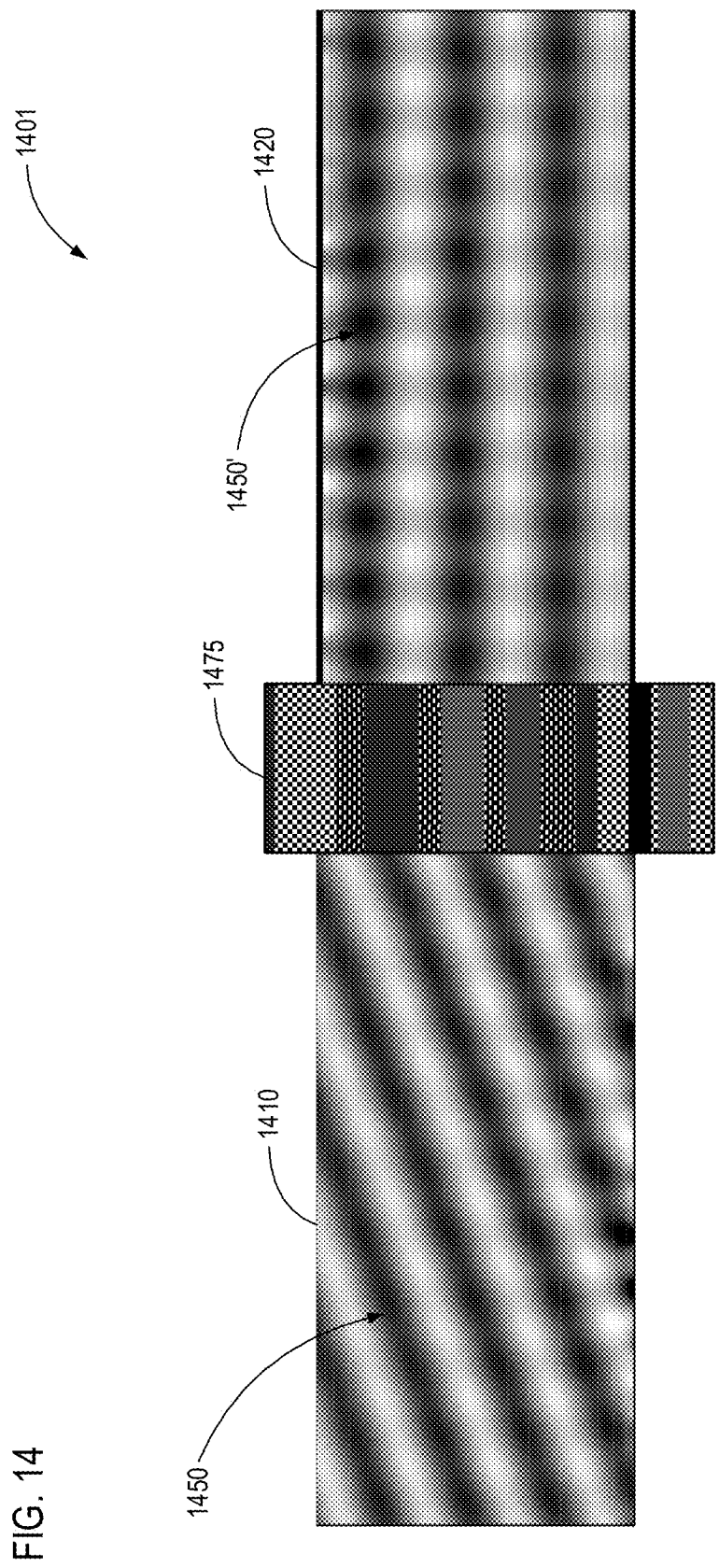

SYSTEMS AND METHODS FOR ACOUSTIC MODE CONVERSION

This application is a continuation of U.S. patent application Ser. No. 15/599,342, filed May 18, 2017, for "SYSTEMS AND METHODS FOR ACOUSTIC MODE CONVERSION" which is hereby incorporated by reference it its entirety.

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc., applications of such applications are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 U.S.C. § 119(e) for provisional patent applications, for any and all parent, grandparent, great-grandparent, etc., applications of the Priority Application(s)). In addition, the present application is related to the "Related Applications," if any, listed below.

PRIORITY APPLICATIONS

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc., applications of the Priority Applications and the Related Applications, including any priority claims, is incorporated herein by reference to the extent such subject matter is not inconsistent herewith.

TECHNICAL FIELD

This disclosure relates to mode converting structures for acoustic radiation devices. A mode converting structure may include a volumetric distribution of acoustic material properties to convert an input acoustic mode to an output acoustic mode, for a finite frequency range.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 14 illustrates a simulated embodiment of ultrasonic energy with the first waveguide in a first mode converted by the mode converting structure into a second mode within the second waveguide.

DETAILED DESCRIPTION

Figure 1A:
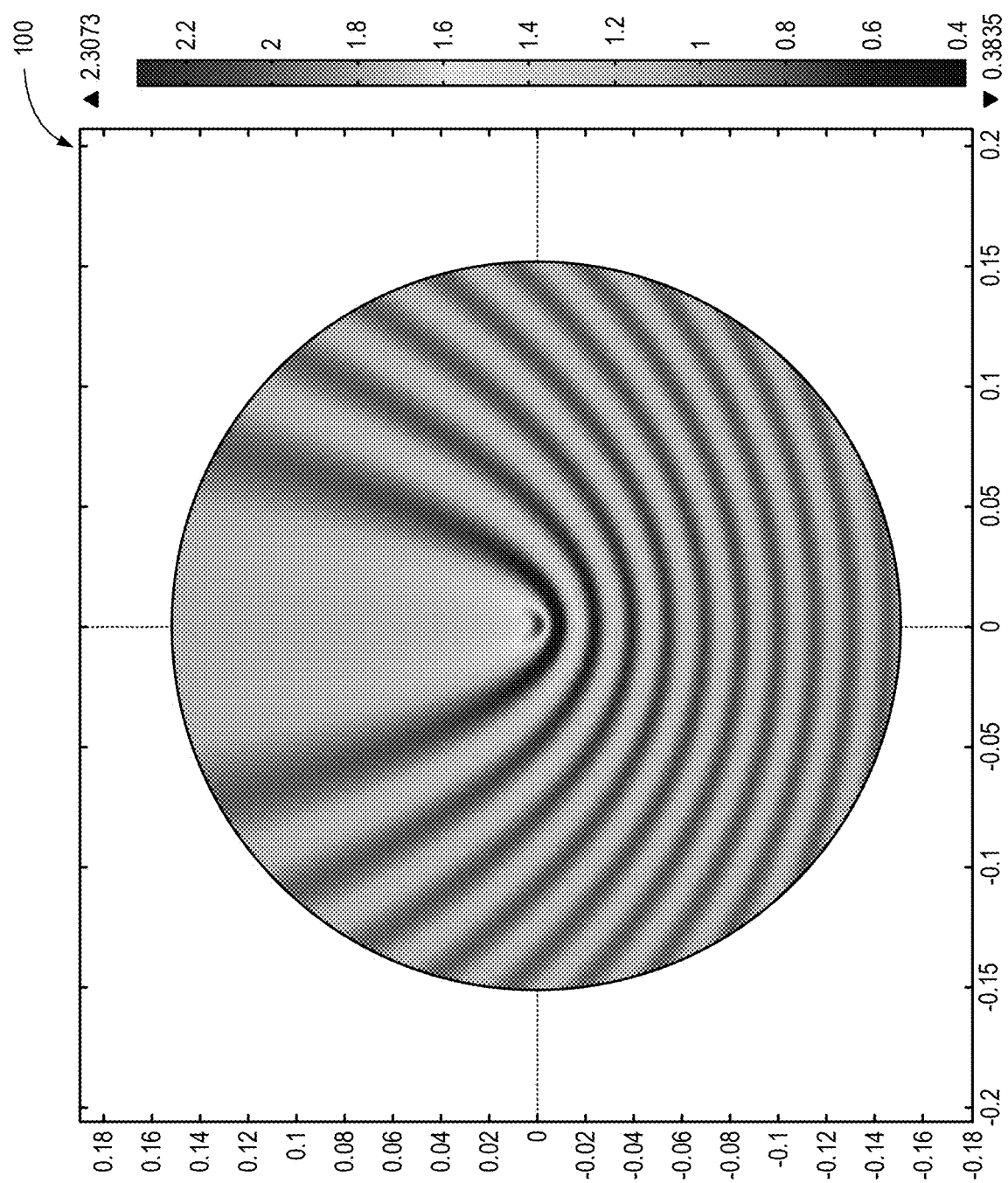
FIG. 1A illustrates an example of a volumetric holographic medium showing real values of a volumetric distribution of refractive indexes for increasing the directionality of a two-dimensionally isotropic line source.

According to various embodiments, systems, apparatuses, and methods are described herein that relate to mode converting structures configured to modify field patterns of electromagnetic radiation (EMR) devices and/or pressure fields of acoustic radiation (AR). For electromagnetic radiation, a mode converting structure may be generated with a volumetric distribution of refractive indexes that can be used to convert an electromagnetic field from a first mode as generated by an original EMR device to a second mode. For acoustic radiation, a mode converting structure may be generated with a volumetric distribution of acoustic material properties that affect the refractive indexes of acoustic waves (such as properties associated with linear elasticity tensor and dynamic density tensor). The acoustic mode converting structure may convert pressure fields from a first mode as generated by an AR device to a second mode.

Some of the embodiments of mode converting structures described herein are equally applicable to AR devices and EMR device. Other embodiments and descriptions may be more suitable for one type of radiation than the other. For example, embodiments describing a distribution of dielectric constants or relating to electrical permittivity may be more suitable for EMR devices. On the other hand, embodiments describing a distribution of acoustic material properties may be more suitable for AR devices. Nevertheless, both are described herein because in many instances elements and configurations of the various embodiments are interchangeable. In particular, the notion of refractive index is applicable both to EMR and AR devices. The mathematical basis for using refractive index descriptions includes the Wave Equation, Helmholtz Equation, and ray approximations (ray acoustics, ray optics, etc.). In some embodiments, a mode converting structure may be formed that provides a first target mode conversion for EMR device and a second target mode conversion for an AR device. Furthermore, the wavelength of an AR device may coincide with the wavelength of an EMR device based on the methods described herein.

For example, the second mode may have a narrower beamwidth, a higher directional gain, lower far-field sidelobes, and/or a more uniform radiation profile in the radiative near-field. In some embodiments, the mode converting structure may modify the pressure field to compensate or negate the effects of a re-radiating, reflective, or refractive object in the near-field or far-field of the radiation device (EMR or AR).

An ultrasonic AR device may generate ultrasonic radiation corresponding to an acoustic near-field distribution of a loudspeaker, electrostatic loudspeaker, a piezoelectric transducer, a MEMS transducer, a magnetostrictive transducer, an electromagnetic acoustic transducer (EMAT), an electrodynamic loudspeaker, and a passive radiator. A mode converting structure may receive a pressure field pattern on an input side of the mode converting structure and output a pressure field pattern on an output side corresponding to an output acoustic radiation in a second mode. The output acoustic radiation in the second mode may correspond to a different acoustic near-field distribution.

The distribution of refractive indexes, dielectric constants or acoustic material properties of a mode converting structure may be selected to modify a field or pressure pattern of the radiating device for a finite frequency range and convert the radiation from a first mode to a second mode.

In various embodiments an EMR mode converting structure, the mode converting structure may be idealized as a graded-permittivity structure having a continuous distribution of dielectric constants, such that there are no abrupt changes in permittivity across the structure. Given a finite range of wavelengths, a discretized piecewise-continuous approximation of the graded-permittivity structure may be electromagnetically equivalent for a given bandwidth. Similarly, a graded-density or other graded-acoustic-material-property structure may be generated and/or used to generate a discretized piecewise-continuous approximation of the mode converting structure having the volumetric distribution of acoustic material properties.

Thus, in various embodiments, the mode converting structure may be divided into a plurality of sub-wavelength voxels. That is, the mode converting structure may be conceptually thought of as comprising a plurality of voxels (three-dimensional pixels) whose largest dimension is smaller than a wavelength within the relevant bandwidth. For example, each voxel may have a maximum dimension that is less than half of a wavelength (e.g., the smallest wavelength) within a predetermined frequency range. The mode converting structure may comprise metamaterials and be referred to as a holographic metamaterial device useful to modify the near-field and/or far-field of an EMR or AR device for a particular frequency range.

In some embodiments, the voxels may be cubes, parallelepipeds, tetrahedrons, pyramids, prisms, various regular polyhedrons, or other polyhedrons. In some embodiments, a voxel may have one or two dimensions that are sub-wavelength while the other dimension(s) are larger than a wavelength. The mode converting structure may be flat or curved and may be ridged or flexible (or have flexible portions at least). A mode converting structure may have a non-uniform thickness and/or may fill voids to create a uniform thickness with non-converting material.

In various embodiments, a combination of voxel shapes and/or sizes may be used. Moreover, voxels may be shaped and/or sized such that little or no space, gaps, or voids exist between voxels. Alternatively, voxels may be arranged such that gaps or voids of various sizes and/or shapes exist. In some embodiments, the gaps or voids may be ignored and/or negligible in calculating the volumetric acoustic material properties. Alternatively, the gaps or voids may be assigned one or more acoustic material properties corresponding to a vacuum or to air or another fluid (liquid or gas) that fills the gaps or voids. Examples of materials include immersion liquids, mineral oil, synthetic oil, and polymer oil. Other examples of materials may include: one or more metamaterials having varying acoustic material properties, aperiodic photonic crystals, composite materials, porous materials, foam materials, layered composite materials, stratified composite materials, fiber-bundle materials, micro-rod materials, nano-rod materials, Because of the effect temperature and pressure may have on acoustic material properties, in some embodiments, mode converting structures may be rated for specific temperature and/or pressure ranges or combinations. In some embodiments, standard ambient temperature and pressure (SATP) may be used as 25 degrees Celsius and 100 kPa of pressure.

In various embodiments, a mode converting structure may be selected to include one or more materials have unique acoustic material properties to attain the target volumetric distribution of acoustic material properties. Examples of acoustic material properties include, but are not limited to, linear elasticity tensor, dynamic density tensor, bulk modulus, elastic modulus, and density. Acoustic material properties of a particular material may vary depending on the finite frequency range for which the ultrasonic mode converter is configured to function.

Throughout this disclosure, discussions of discretizing the mode converting structure may mean different things in various embodiments. For example, in some embodiments, the conceptual discretization of the mode converting structure may be used for optimization algorithms, while the mode converting structure may not be physically discretized. In some embodiments, the discretization of the mode converting structure may be a physical discretization of the mode converting structure. Physical discretization may be useful for manufacturing simplification (e.g., for three-dimensional printing of a mode converting structure). Thus, allusions to discretizing, dividing into voxels, and the like should be understood in the context of either manufacturing or optimization, and sometimes both. In the absence of explicit context, discussions should be construed as implying manufacturing and optimization individually, and as implying the possibility of a discretization for both manufacturing and optimization.

A manufactured mode converting structure may be positioned relative to a radiation device (EMR or AR), may be removable, and/or may be configured as a retrofit solution for an existing antenna system. The shape and dimensions of the mode converting structure may be adapted based on the radiation device used.

In various embodiments, an EMR device may include, by way of example but not limitation, a radio frequency antenna, an optical radiation transmitter, and an optical radiation receiver, and/or an electro-optical EMR device configured to convert between electric current and optical radiation or vice versa.

In various embodiments, an AR device may include, by way of example but not limitation, an acoustic transducer, an acoustic transmitter, an acoustic receiver, an ultrasound transducer, an infrasound transducer, an audible acoustic radiation device, a vibration device, a sonic radiation device, and/or an optical radiation antenna configured to convert between acoustic vibration and electric current.

An EMR mode converting structure may be used to modify field distributions of the EMR device. An AR mode converting structure may be used to modify a pressure field distribution of the EMR device. For instance, a mode converting structure may be used to modify the field or pressure distribution of a low-directivity antenna to correspond to that of a higher-directivity, narrow-beamwidth antenna. The mode converting structure allows for the beam pattern of a radiation device to be modified without any modification, or at least any significant modification, to radiation device, radiation feed, or the environment of the radiation device. Thus, the mode converting structures disclosed herein allow for a retrofit modification of existing radiation devices. As specific examples, a mode converting structure may improve the directivity of an AR device that normally has a directivity between 2, 5, 10, 15, or 20+ dBi.

In other embodiments, an acoustic mode converting structure may be configured to narrow a far-field beamwidth of a main or side lobe, create maximum pressure fields in certain locations, or create pressure nulls in certain locations. The mode converting structure may be configured with a volumetric distribution of acoustic material properties to modify the far-field radiation pattern to compensate for a re-radiating object positioned in the reactive/Fresnel or radiative/Fraunhofer near-field of the AR device.

The following specific examples use radio frequency (RF) antennas as an example of EMR devices generally. However, it is appreciated that many of the same concepts, embodiments, and general functionality of the systems and methods described herein are equally applicable to other frequency ranges of EMR, including those utilizing low-frequency RF, microwave, millimeter-wave, Terahertz, far and mid-infrared, near infrared, visible light, ultraviolet, x-rays, gamma rays, and so forth. It is appreciated that the sizes, refractive index values, materials, and other variables may be adjusted based on the particular spectrum in use. Furthermore, it is appreciated that many of the same concepts can be applied to, for example, transducers instead of antennas and ultrasound instead of electromagnetic energy.

Many antennas, such as electrically small dipoles, monopoles, and loop antennas are fundamentally limited in their directionality. Horn-shaped antennas can have better directionality, so long as their dimensions are not significantly sub-wavelength. At any rate, once fabricated and installed, fixed-shape, single-feed antennas generally have a fixed radiation pattern and a certain beamwidth, although it may vary based on frequency.

Additionally, as described above, a mode converting structure may be divided into a plurality of sub-wavelength voxels that each have a maximum dimension that is less than a wavelength (e.g., three-quarters, half, one-third, one-quarter, one-tenth of a wavelength) for a specific frequency range. As above, each voxel may then be assigned one of a plurality of dielectric constants (or acoustic material properties) to approximate an identified distribution of dielectric constants (or acoustic material properties). A mode converting structure may be used for free-space transmission and/or receiving. Alternatively or additionally, a mode converting may be utilized to convert acoustic or electromagnetic energy from a first mode to a second mode within a first waveguide, between two waveguides, between a waveguide and free space, and/or between free space and a waveguide.

For example, the distribution of acoustic material properties may convert acoustic energy within the waveguide at a first mode to a second mode. As another example, the distribution of acoustic material properties may be configured to convert acoustic energy within a first waveguide from a first mode to a second mode for transmission through one or more additional waveguides.

Similarly, the distribution of dielectric constants may convert electromagnetic energy within the waveguide at a first mode to a second mode. As another example, the dielectric structure may be configured to convert electromagnetic energy within a first waveguide from a first mode to a second mode for transmission through one or more additional waveguides.

Again, in each of the embodiments described herein, the embodiments, modifications, adaptations, equations, algorithms, and/or other variations may be adapted for use in free-space applications, in transmitting antennas, in receiving antennas, within a waveguide, between two different waveguides, from a transmission line to free space, from a first transmission line to a second transmission line, between a waveguide transmission line to a non-waveguide transmission line, from a non-waveguide transmission line to a waveguide transmission line, for any of a wide variety of frequencies and bandwidths, and/or in combinations and permutations of any of the above.

Thus, embodiments in which radiation devices, antennas, and free-space applications are used as the example application for a mode converting device are equally applicable to embodiments relating to waveguides and other transmission lines, even if not explicitly stated herein.

As described above, mode converting structures may be used to transform the near-field and/or far-field of a fixed radiation device without necessarily modifying the radiation device, installation, and/or surrounding environment. According to various embodiments, a holographic solution may be used to determine a volumetric distribution of dielectric constants that can provide a desired field transformation and mode conversion for free-space applications and waveguide/transmission line applications alike. Similarly, a holographic solution may be used to determine a volumetric distribution of acoustic material properties that can provide a desired pressure transformation and mode conversion for free-space applications and waveguide/transmission line applications alike.

For example, a mode converting structure may include a volumetric distribution of primary acoustic refractive indices. A primary acoustic refractive index, $n_p$, may correspond to the speed of primary wave, or the p-sound. Specifically, $n_p = c_0/c_p$, where $c_0$ is the speed of sound in the ambient fluid and $c_p$ is the speed of p-sound in that medium.

In such an embodiment, a volumetric distribution of primary acoustic refractive indices can be determined using Equation 1 below, or a variation thereof:

$$n^2(x,y,z) - 1 = \beta |p_{in} \cdot p^*_{goal}/p_{goal}|^2 \qquad \text{Equation 1}$$

In Equation 1, $n^2(x,y,z)$ represents a volumetric distribution of primary acoustic refractive indices in an x, y, z coordinate system. In many embodiments described herein, a Cartesian coordinate system is used as a default example; however, any of a wide variety of coordinate systems are suitable, including cylindrical, polar, barycentric, trilinear, and other coordinate systems. In fact, in some embodiments, alternative coordinate systems may be preferable to simplify calculations and/or facilitate manufacturing. For instance, a cylindrical coordinate system may be useful for a manufacturing technique in which the volumetric distribution of dielectric constants corresponds to a uniform rotation of a two-dimensional planar cross section around an axis of revolution.

In Equation 1, $\beta$ represents a normalization constant and $P_{in}$ represents an input pressure field distribution of acoustic radiation from (1) an AR device on the surface of the mode converting structure relative to the x, y, z coordinate system, (2) the input pressure field distribution of radiation within a first waveguide or first waveguide portion (e.g., an acoustic transmission medium) relative to the x, y, z coordinate system, or (3) the input pressure field distribution of the radiation from free space (e.g., air) into a waveguide or other transmission medium, relative to the x, y, z coordinate system. Subsequent descriptions of Equation 1 with application to AR devices, are equally applicable to waveguide, various transmission mediums, and free-space (e.g., air) applications. Field $p_{goal}$ represents the "goal" or selected, desired, target output pressure field distribution of radiation from the mode converting structure relative to the x, y, z coordinate system.

The calculated distribution of dielectric constants may be approximated by conceptually dividing the mode converting structure into a plurality of voxels. Each voxel can then be assigned an acoustic refractive index. In some embodiments, each voxel may be assigned a spatial average value corresponding to the average calculated acoustic refractive index for the volume of the voxel.

In embodiments in which the discretization is binary, ternary, or N-ary, each voxel may be assigned an acoustic refractive index from a selection of N discrete acoustic refractive indices, where N is an integer greater than 1 (2 for binary, 3 for ternary, and so forth).

As a specific example, a region having a size that is distinguishable at the frequency of the ultrasonic radiation may contain multiple voxels. If the region should have, on average, an acoustic refractive index of 0.486, this may be satisfied by conceptually dividing the region into 100 voxels and using a first material with an acoustic refractive index of 0.9, to fill 31 of those voxels and a second material with an acoustic refractive index of 0.3, to fill the other 69 voxels. Thus, the average acoustic refractive index of the region will approximate 0.486. Similar approximations can be made using any number of materials having any number of acoustic refractive index. In some embodiments, frequency-dependent metamaterials having effective acoustic refractive indices that are more than 1, less than 1, and even less than 0 may be utilized.

In various embodiments, the volumetric distribution of acoustic refractive indices may be substantially homogenous in one spatial dimension of the coordinate system, such that the volumetric distribution of the mode converting structure is effectively two-dimensional even though it is physically a three-dimensional object. For instance, the volumetric distribution may correspond to a uniform extrusion of a planar two-dimensional distribution perpendicular to the plane.

In various embodiments, an acoustic mode converting device may include one or more transparent materials. Examples of various possible materials include, but are not limited to transparent inorganic glasses, transparent polymers, glass polymers, thermoplastics, inorganic glasses, doped inorganic glasses, nanoparticle embedded glasses, nanoparticle embedded polymers, polymers with varying polymerization numbers, etc. In some embodiments, a mode converting structure may take the form of a functional or even structural element. For example, a transparent mode converting structure may be used as a window for a car or building. Opaque mode converting structures may be used as wall coverings, doors, flooring, mirrors, etc.

As previously noted, many of the embodiments of mode converting structures described herein are applicable to AR devices and EMR device. Of course, because the properties of electromagnetism and acoustics are different, different variables and modifications to the equations may be appropriate. However, examples described in terms of acoustic radiation are often applicable to electromagnetic radiation, and vice versa. The following table illustrates some analogies and similarities of acoustics and electromagnetism. Table 1 below is found in "Acoustic Metamaterial Design and Applications" by Shu Zhang, University of Illinois at Urbana-Champaign, 2010, which is hereby incorporated by reference in its entirety.

TABLE 1

| Acoustics | Electromagnetism (TMz) | Analogy |
| --- | --- | --- |
| $\dfrac{\partial P}{\partial x} = -i\omega\rho_x u_x$ | $\dfrac{\partial E_z}{\partial x} = -i\omega\mu_y H_y$ | |
| $\dfrac{\partial P}{\partial y} = -i\omega\rho_y u_y$ | $\dfrac{\partial E_z}{\partial y} = i\omega\mu_x H_x$ | |
| $\dfrac{\partial u_x}{\partial x} + \dfrac{\partial u_y}{\partial y} = -i\omega\beta P$ | $\dfrac{\partial H_y}{\partial x} - \dfrac{\partial H_x}{\partial y} = -i\omega\varepsilon_z E_z$ | |

TABLE 1-continued

| Acoustics | Electromagnetism (TMz) | Analogy |
|---|---|---|
| Acoustic pressure P | Electric field $E_z$ | $-E_z \leftrightarrow P$ |
| Particle velocity $u_x$, $u_y$ | Magnetic field $H_x$, $H_y$ | $H_y \leftrightarrow -u_x$, $H_x \leftrightarrow u_y$ |
| Dynamic density $\rho_x$, $\rho_y$ | Permeability $\mu_x$, $\mu_y$ | $\rho_x \leftrightarrow \mu_y$, $\rho_y \leftrightarrow \mu_x$ |
| Dynamic compressibility $\beta$ | Permittivity $\varepsilon_z$ | $\varepsilon_z \leftrightarrow \beta$ |

FIG. 1A illustrates an example of a holographic solution showing real values of a volumetric distribution of dielectric constants 100 using a modified version of Equation 1 above for electric fields:

$$\varepsilon_{hol}(x,y,z)-1=\beta E_{goal} \cdot E^*_{in}/|E_{in}|^2 \quad \text{Equation 1.1}$$

The illustrated volumetric distribution of dielectric constants is calculated for an idealized two-dimensionally isotropic line source EMR device. A mode converting structure (i.e., a holographic metamaterial) with a corresponding distribution of dielectric constants could be used as a cover for the line source EMR device to increase the directionality of the line source EMR device.

Similar to FIG. 1A, Equation 1 above may be used to determine a distribution of acoustic refractive indices. Alternatively, a modified version of Equation 1 may be used to determine a volumetric distribution of a combination of materials having varying linear elasticity tensors, dynamic density tensors, bulk moduli, elastic moduli, and densities.

Figure 1B:
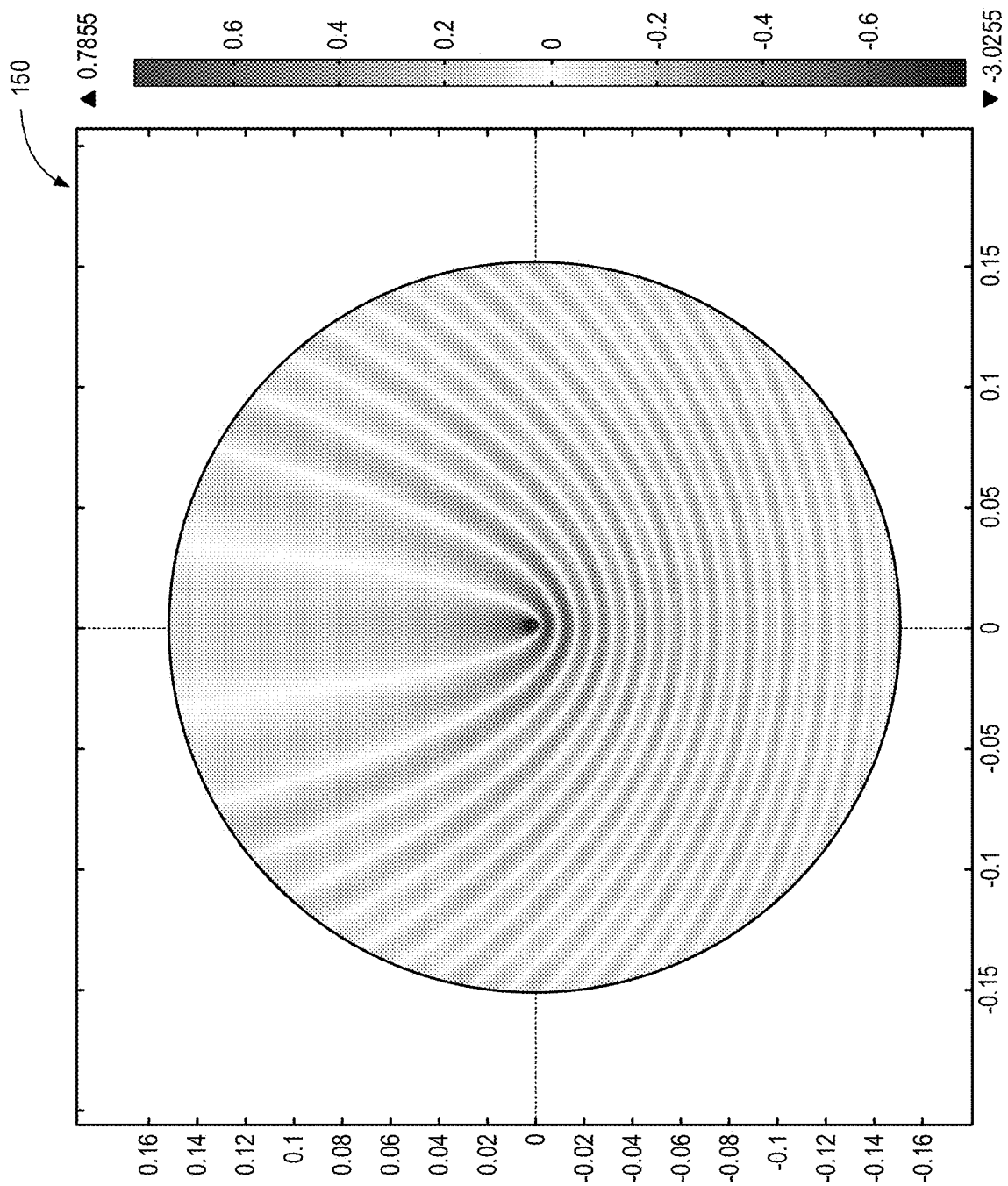
FIG. 1B illustrates an example of a holographic solution showing imaginary values of a volumetric distribution of refractive indexes for increasing the directionality of a two-dimensionally isotropic line source.

FIG. 1B illustrates the imaginary values of the volumetric distribution of dielectric constants 150 for the same line source EMR device described in conjunction with FIG. 1A above.

The "goal" or "target" electromagnetic field used to generate FIGS. 1A and 1B is a plane wave with infinite directivity. The example, although idealized, illustrates one method for generating a mode converting structure for converting the electromagnetic field generated by an EMR device to a second mode with improved radiation characteristics. In practice, the finite aperture of the holographic metamaterial domain limits the actual directivity that can be attained. To account for the aperture effect, another option would be to use a Gaussian beam whose waist is equal to or small than the diameter of the holographic metamaterial domain.

Figure 2A:
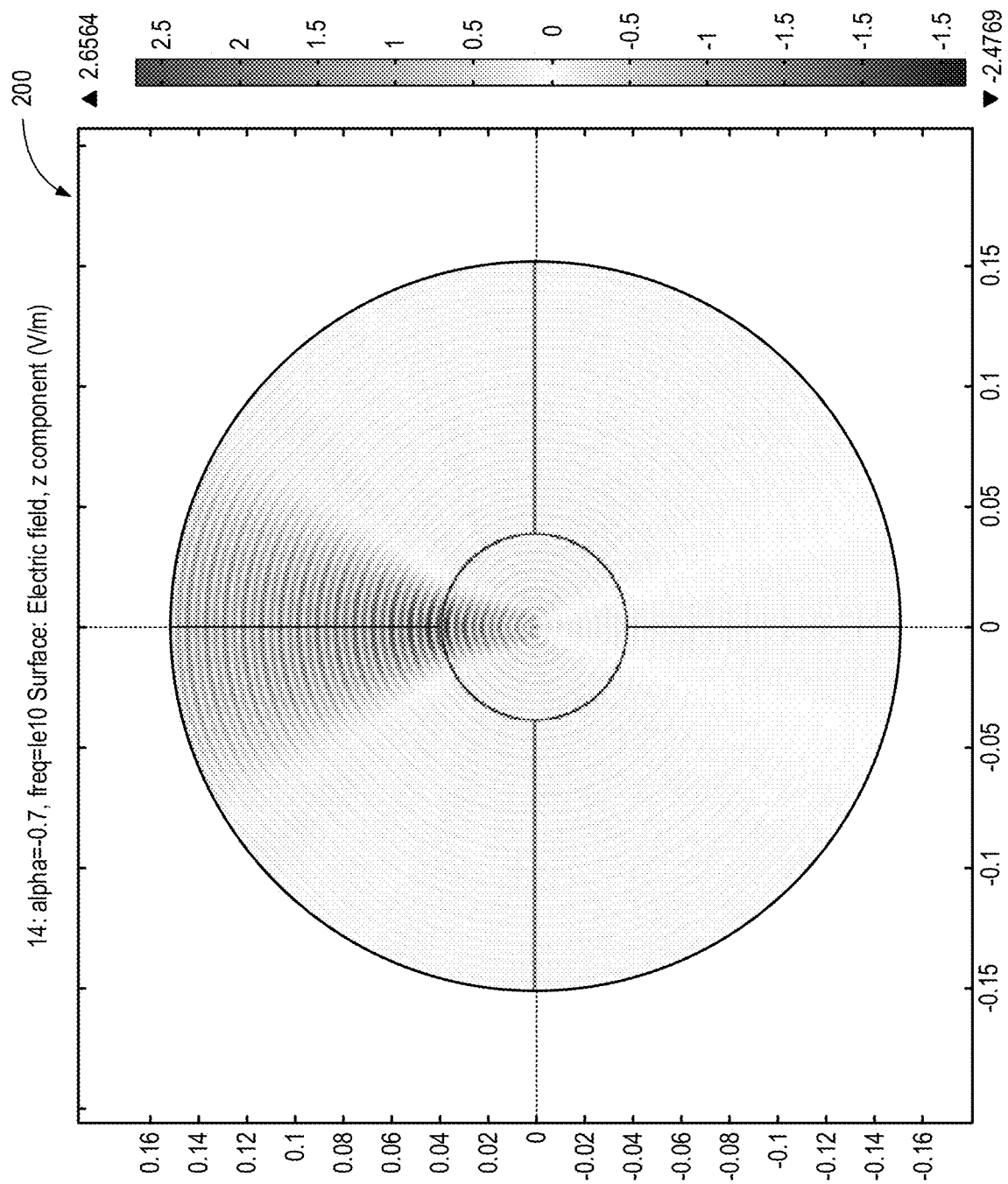
FIG. 2A illustrates an example of a field distribution of a line source surrounded by a holographic metamaterial (mode converting structure) that has a distribution of refractive indexes approximating the distribution shown in FIGS. 1A and 1B.

FIG. 2A illustrates an example of a field distribution 200 of the line source EMR device surrounded by a holographic metamaterial (mode converting structure) that has a distribution of dielectric constants approximating the distributions (real and imaginary) shown in FIGS. 1A and 1B.

Figure 2B:
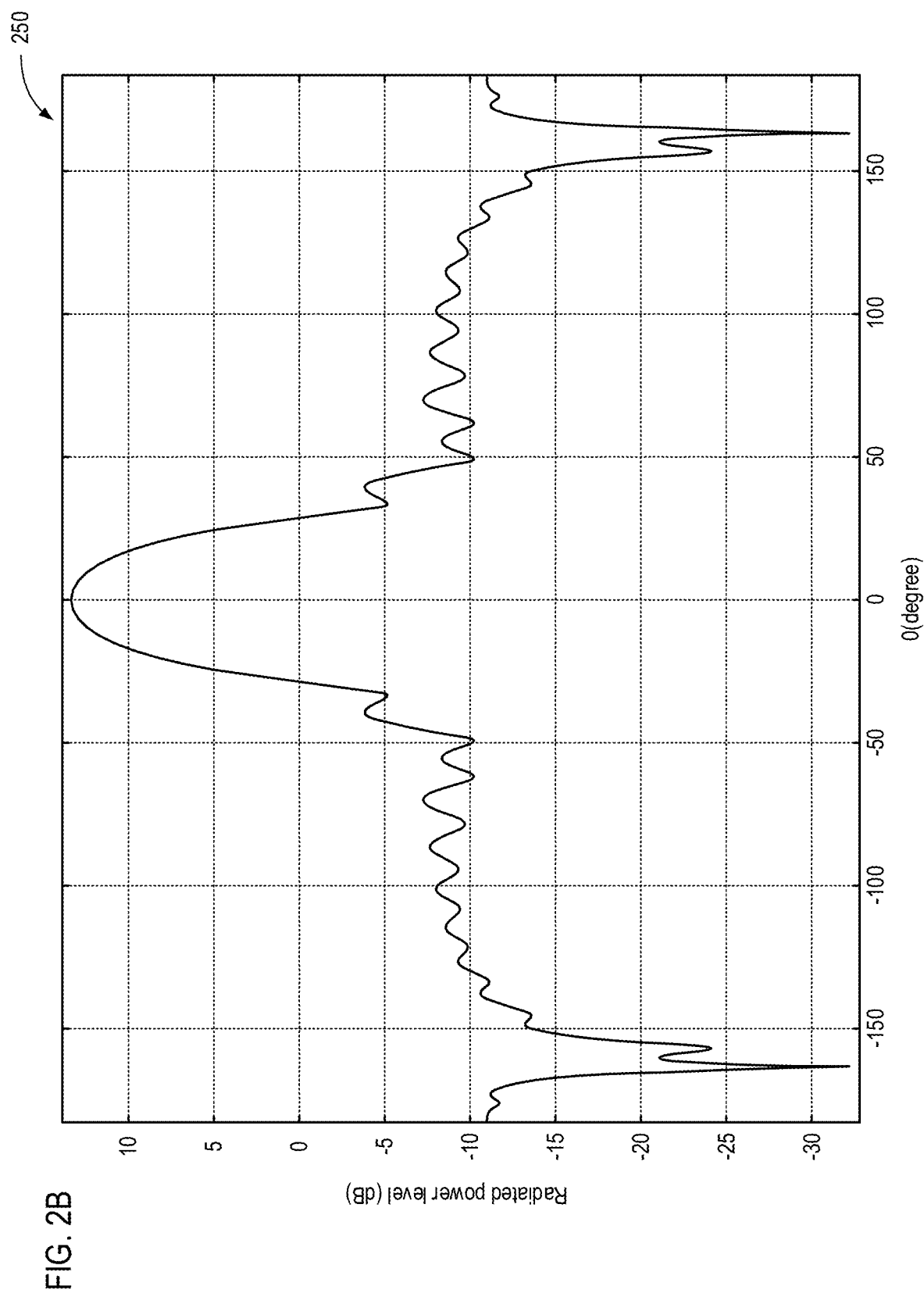
FIG. 2B illustrates an example of a far-field radiation pattern of the line source in FIG. 2A surrounded by the mode converting structure having the distribution of refractive indexes shown in FIGS. 1A and 1B.

FIG. 2B illustrates an example of a far-field radiation pattern 250 of the line source EMR device surrounded by the mode converting structure having the distribution of dielectric constants (real and imaginary) shown in FIGS. 1A and 1B.

The Equation 1.1 for electric fields and permittivity values may be used to identify a distribution of dielectric constants with complex permittivity values in all four quadrants of the complex variable plane, including the half-plane corresponding to active-gain medium, and possibly the quadrant corresponding to a passive, negative-permittivity medium. In such embodiments, active-gain permittivity values and negative permittivity values may be attainable using metamaterials. For instance, the distribution of dielectric constants can be discretized into sub-wavelength voxels each being assigned a particular permittivity value. Some of the voxels may be assigned permittivity values that can be implemented with traditional low-loss dielectrics, while other voxels may be assigned permittivity values (active-gain and negative) that can be implemented with metamaterials.

In some situations, it may be desirable to utilize low-loss dielectrics in which $\varepsilon'\geq 1$ and $\varepsilon''\ll 1$. Such materials may be referred to as non-superluminal low-loss dielectrics (NSLLDs). Some material may only be considered NSLLD for specific frequency bands. Accordingly, the materials used to generate a mode converting structure may depend highly on the specific frequencies and bandwidths utilized by a particular EMR device.

For acoustic mode converting structures, an alternative to Equation 1 may be used as:

$$n^2(x,y,z)-1=\beta|p_{goal}+p_{in}|^2/|p_{in}|^2 \quad \text{Equation 2}$$

In Equation 2 above, $n^2$ (x,y,z) represents a volumetric distribution of acoustic refractive indices in an x, y, z coordinate system. Again, any coordinate system may be used that is suitable for the calculation of the distribution of acoustic refractive indices and/or is useful for mapping a manufacturing process. Constant $\beta$ represents a non-zero normalization constant and field $p_{in}$ represents an input pressure field distribution of acoustic radiation from an AR device, within a waveguide or other transmission medium, and/or on a coupling between a waveguide and free space on the surface of the mode converting structure relative to the x, y, z coordinate system. Field $p_{goal}$ represents the "goal" or selected/desired/target output field distribution of acoustic radiation from the mode converting structure relative to the x, y, z coordinate system.

Solving the equations above and/or other equations described herein, may be performed using an optimization algorithm in which the acoustic refractive indices are treated as optimizable variables. The real and/or imaginary parts of the acoustic refractive indices may be treated as independently optimizable variables, or complex values may be selected and used as the optimizable variables. Any of a wide variety of optimization algorithms may be used, including those (1) in which a cost function is determined for each modification or group of modifications, (2) in which a gradient of a cost function based on partial derivatives is made with respect to each of the optimizable variables, and (3) in which a sensitivity vector is calculated using an adjoint solution-based sensitivity calculation.

In some embodiments, a constrained optimization algorithm may be used in which the acoustic refractive indices are treated as optimization variables constrained to have real parts greater than or equal to approximately N and imaginary parts equal to approximately M, where N and M are real numbers. In other embodiments, a guess-and-check approach may be used in which an initial guess is used to solve the holographic solution using any one of the equations described herein. Non-exhaustive examples of specific optimization algorithms are described in greater detail below.

Figure 3:
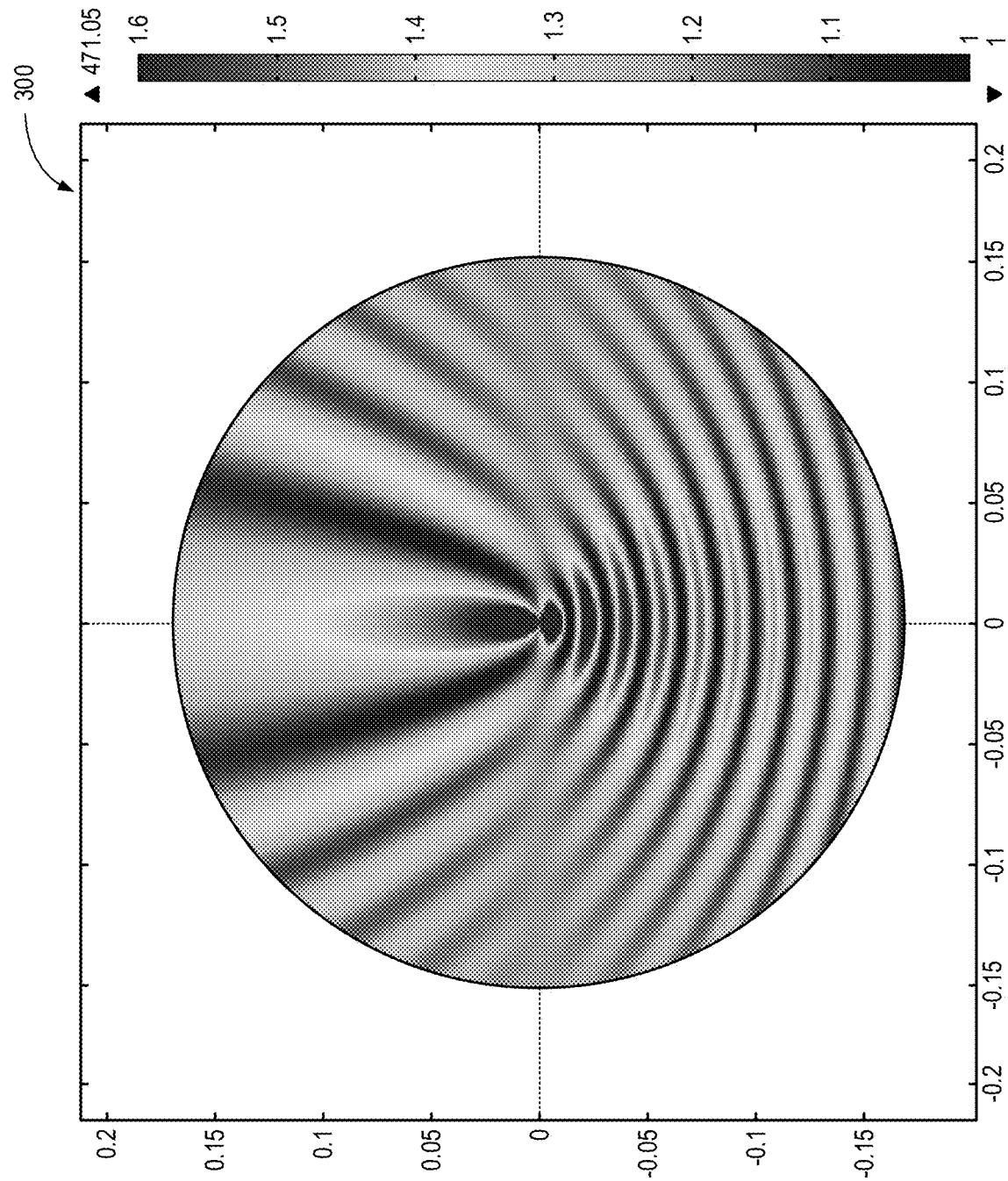
FIG. 3 illustrates an example of a volumetric distribution of refractive indexes for converting a radiation pattern of a two-dimensional point dipole antenna into a directional beam.

FIG. 3 returns to an example of an electromagnetic radiation mode converting structure and illustrates an example of a volumetric distribution of dielectric constants 300 for converting a radiation pattern of a two-dimensional point dipole antenna into a directional beam. The distribution of dielectric constants illustrated in FIG. 3 can be found using an electromagnetic variation of Equation 2 above with the target or goal output field set as a plane wave:

$$\varepsilon_{hol}(x,y,z)-1=\beta|E_{goal}+E_{in}|^2/|E_{in}|^2 \quad \text{Equation 2.1}$$

For the purposes of this calculation, the plane wave would be indistinguishable from a finite-width beam, given the finite diameter of the metamaterial domain used.

Figure 4A:
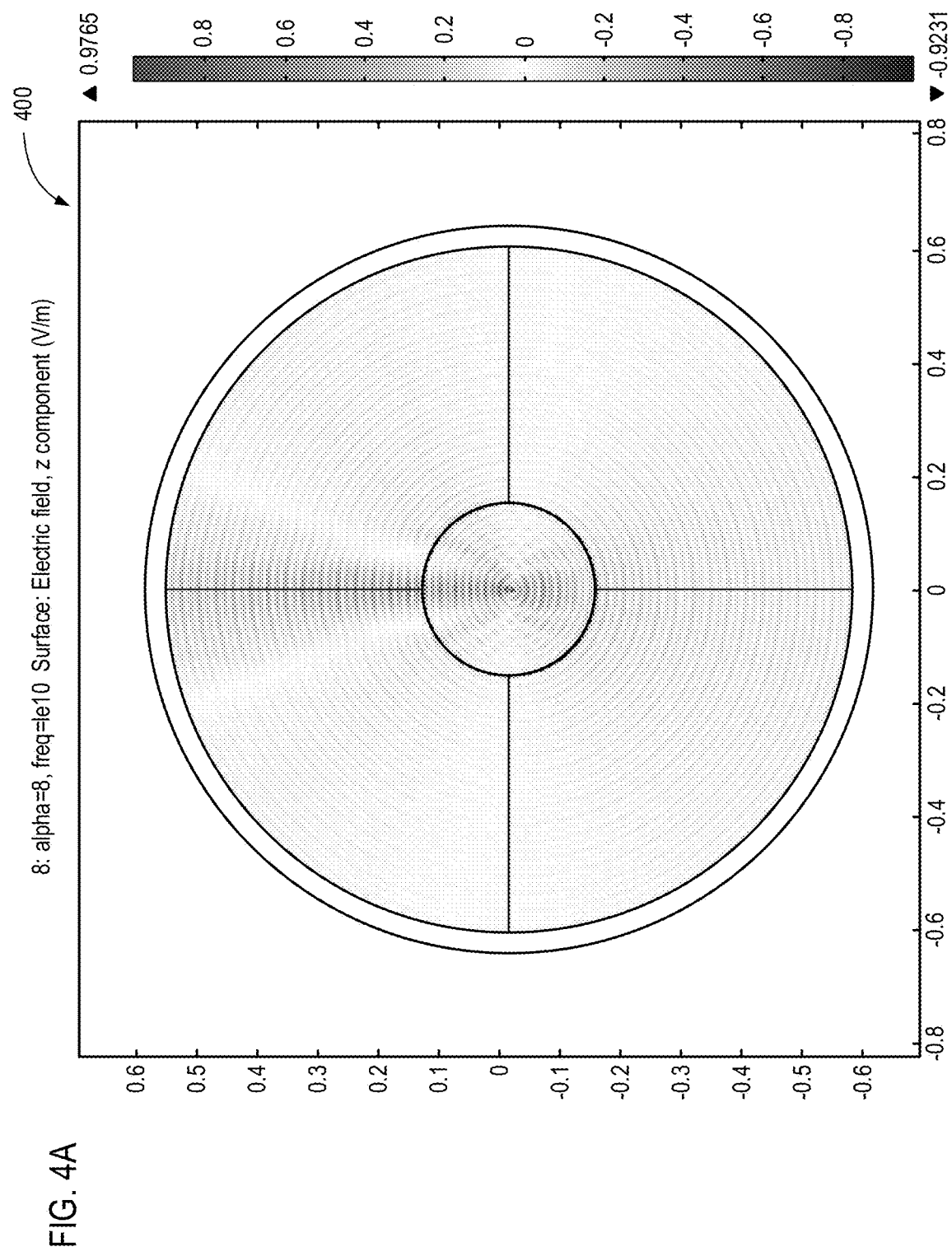
FIG. 4A illustrates an example of a field distribution of a two-dimensional point-dipole source surrounded by a mode converting structure that has a distribution of dielectric constants approximating the distribution shown in FIG. 3.

FIG. 4A illustrates an example of a field distribution 400 of a two-dimensional point-dipole antenna surrounded by a mode converting structure that has a distribution of dielectric constants approximating the distribution shown in FIG. 3.

Figure 4B:
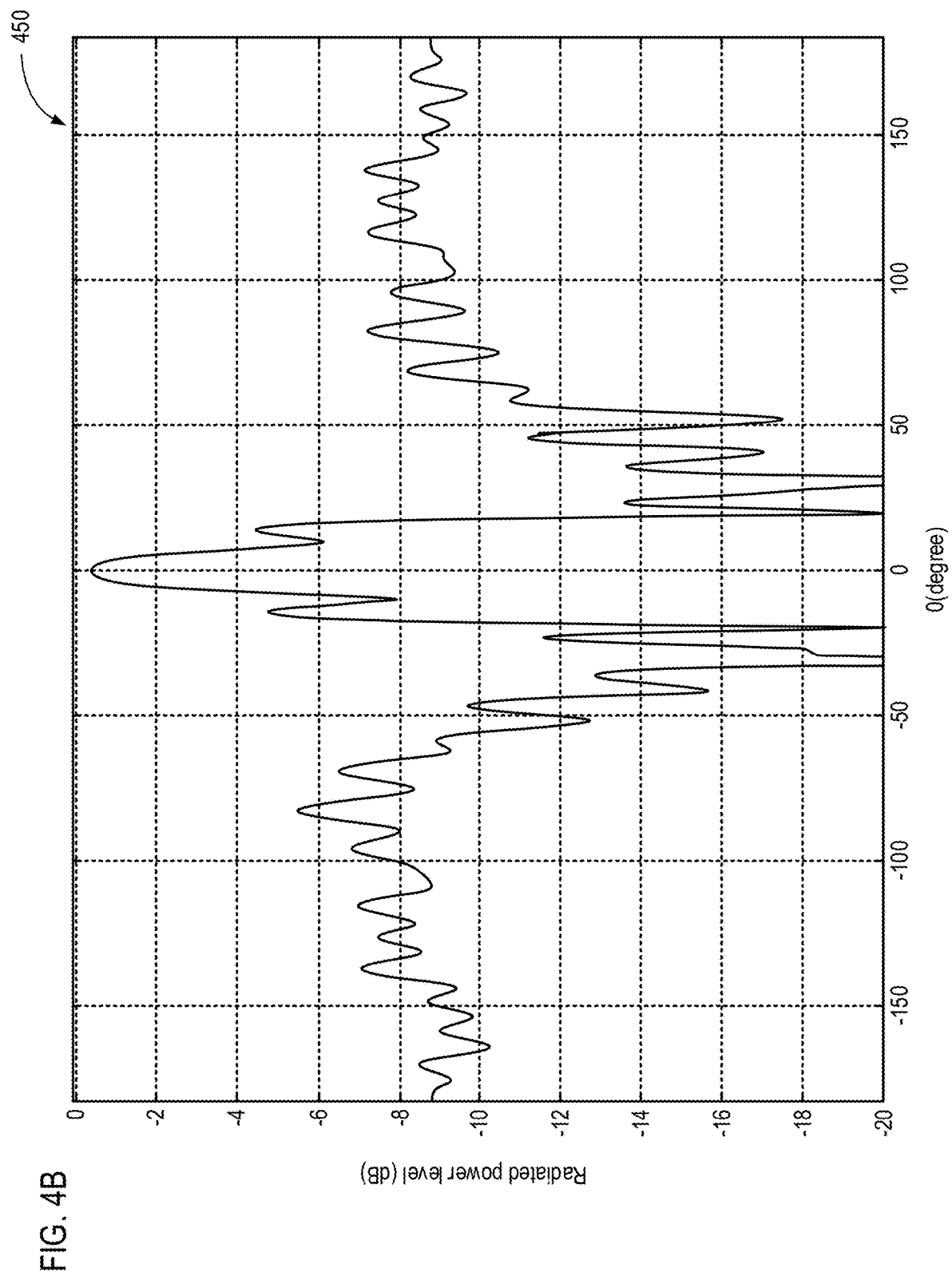
FIG. 4B illustrates an example of a far-field radiation pattern of the two-dimensional point dipole source in FIG. 4A surrounded by the mode converting structure having the distribution of refractive indexes shown in FIG. 3.

FIG. 4B illustrates an example of a far-field radiation pattern 450 of the two-dimensional point dipole antenna in FIG. 4A surrounded by the mode converting structure having the distribution of dielectric constants shown in FIG. 3.

Equations 1 and 2 above provide adequate solutions to finding distributions of acoustic refractive indices for generating mode converting structures. However, further optimization may improve the efficiency of the mode conversion and compensate for the finite metamaterial domain. The metamaterial domain may be conceptually split into a plurality of voxels, where each voxel is approximately less than one-half wavelength (e.g., one-tenth of a wavelength). Each voxel may be conceptually populated with a spatial average of the continuous acoustic refractive index found using Equation 1 or 2 above. This discrete distribution of dielectric constants may be used as an initial guess in an optimization algorithm. The optimization algorithm may treat the real and imaginary values of the acoustic refractive index in each voxel as independent control variables. Alternatively, the complex (or real) value in each voxel may be treated as an independent value.

Any of a wide variety of optimization algorithms may be used. For example, a small perturbation to one of the control variables may be made, and then the forward wave propagation problem may be solved to determine the effect of the perturbation. This may be referred to as a cost function optimization in which the cost function is the difference between the target or goal field and the field produced by the current state of the optimization variables. The finite difference in the goal, divided by the small perturbation value of the control variable, may be referred to as the finite-difference estimate of the cost function partial derivative. After computing all of the partial derivatives with respect to all control variables, the combined vector may be referred to as the "gradient" of the cost function, also known as "a sensitivity vector."

In other embodiments or as an alternative in the same embodiments, an adjoint method may be used that is based on the analytical derivatives of the equation describing the forward problem. The adjoint method may be used to produce the entire sensitivity vector after solving just one auxiliary problem known as the adjoint problem, whose computational complexity is the same as the complexity of one forward problem of the same size. In some applications, this may reduce the amount of computation per optimization step by a factor of N, where N is the number of control variables.

Once a sensitivity vector is obtained, an iteration of a standard Newton, damped Newton, conjugate-gradient, or any other gradient-based iterative nonlinear solver may be used to determine the next configuration.

In some embodiments the optimization algorithms may use heuristics as part of the optimization process. This may be useful in embodiments where the control variables are non-differentiable. In those embodiments it may be difficult to determine the gradient of the sensitivity vector or the analytic derivative. For example, in some embodiments, the optimization algorithm may use iterative heuristic optimization techniques such as, particle swarm optimization (PSO) or genetic optimization to determine an optimal solution.

In one embodiment the iterative heuristic optimization may begin by generating a family of possible solutions. The family of possible solutions may contain thousands or millions of possible optimal solutions. Each, of the possible solutions may be generated according to a predetermined representation of the optimal solution domain. In other embodiments the predetermined solutions may be generated randomly. The predetermined representation may include properties of the optimal solution (e.g., transmission mode, manufacturing constraints, acoustic material properties, boundary conditions, or optimization variables).

With each iteration of the heuristic optimization process the possible solutions may be evaluated using a fitness function. Solutions that are "more fit", as determined by the fitness function, may be stochastically selected to continue on to the next iteration. Each, iteration may add new possible solutions or remove less fit solutions. In addition, with each successive iteration properties of each solution may be modified, altered, mutated, exchanged, updated, or changed in any way or combination of ways useful in determining an optimal solution. The algorithm may iterate a finite number of times or it may iterate until an acceptable solution is reached.

An optimization algorithm may be utilized until a predetermined termination tolerance(s) is met. A termination condition can be imposed on some norm of the sensitivity vector, in which case the optimization algorithm is guaranteed to converge. A termination condition can be imposed as an inequality on the scalar value of the cost function, in which case the algorithm may fail to meet the imposed condition. In various embodiments, it may be useful to apply a termination condition to a sensitivity vector, and to take the final value of the optimization cost function as an output of the algorithm instead of an input to the algorithm.

For applications that require the final value of the cost function to be below a certain tolerance, the optimization loop that failed to produce such an outcome can be repeated with a different initial guess. Each of Equations 1 and 2 define a family of initial guesses, each of which can be used to initiate a different optimization loop. Such loops are entirely independent and can be computed in parallel, using distributed computing.

Figure 5:
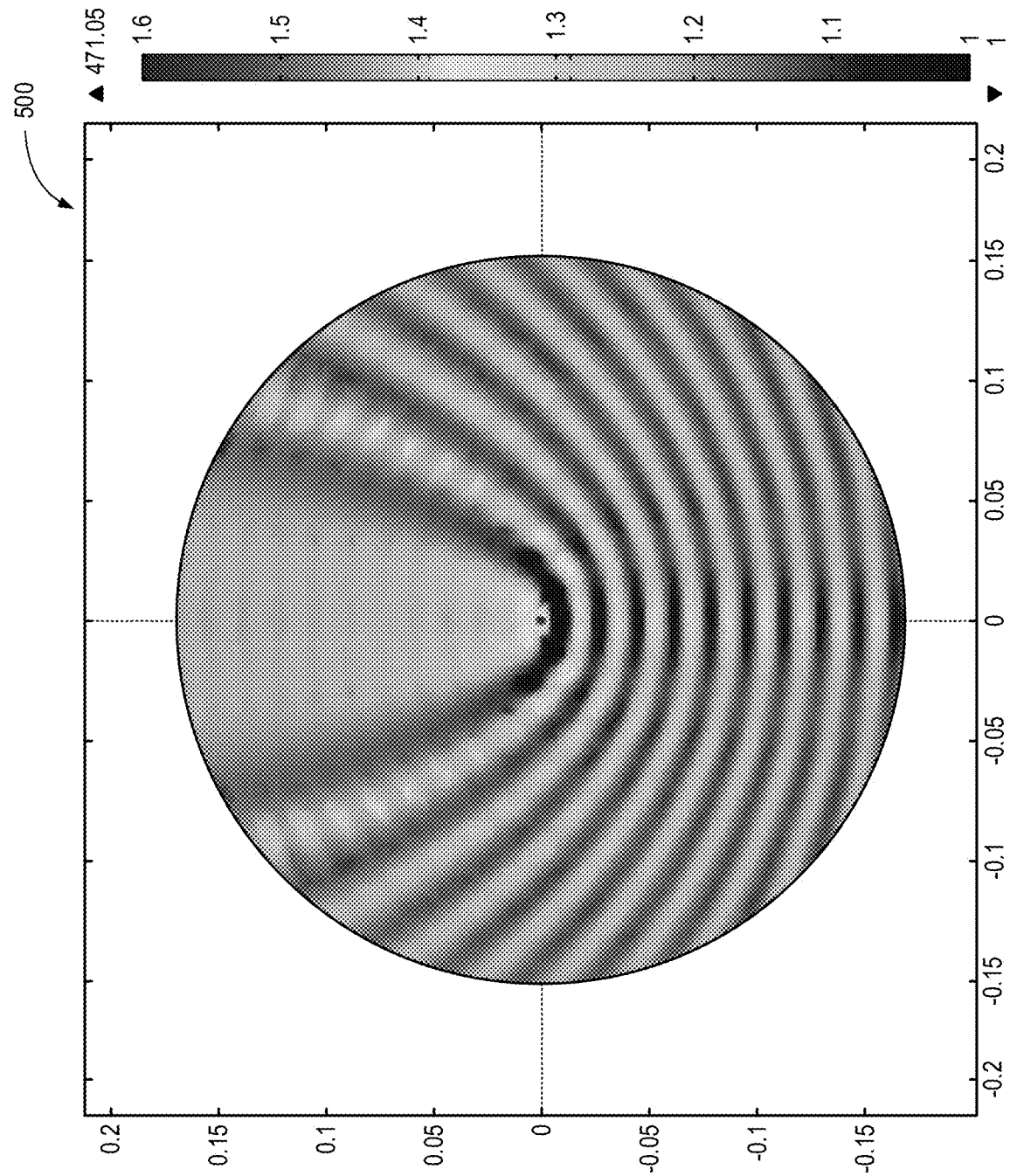
FIG. 5 illustrates an example of an optimized volumetric distribution of refractive indexes generated by optimizing the solution shown in FIG. 1A.

Using an electromagnetic variation as an example, FIG. 5 illustrates the optimization 500 of the real part of the dielectric constant distribution shown in FIG. 1A using the adjoint sensitivity method and a conjugate-gradient nonlinear solver. In the illustrated optimized dielectric constant distribution, discretized values from FIG. 1A are used as an initial guess. The optimization algorithm converged to the solution shown in FIG. 5.

Figure 6A:
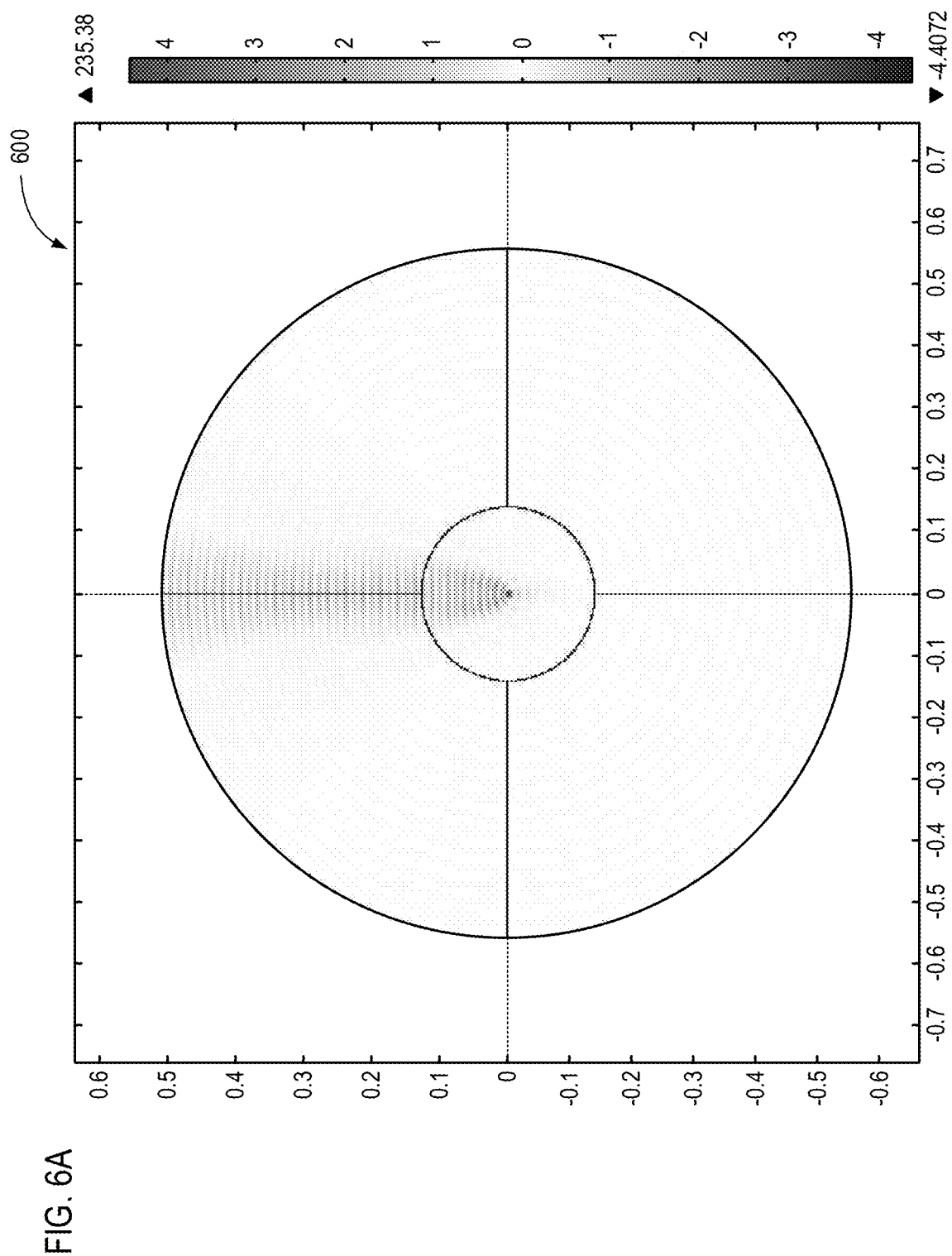
FIG. 6A illustrates an example of a field distribution of the two-dimensionally isotropic line source surrounded by a mode converting structure that has a distribution of refractive indexes approximating the distribution shown in FIG. 5.

FIG. 6A illustrates an example of a field distribution 600 of the two-dimensionally isotropic line source EMR device surrounded by a mode converting structure that has a distribution of dielectric constants approximating the optimized distribution shown in FIG. 5.

Figure 6B:
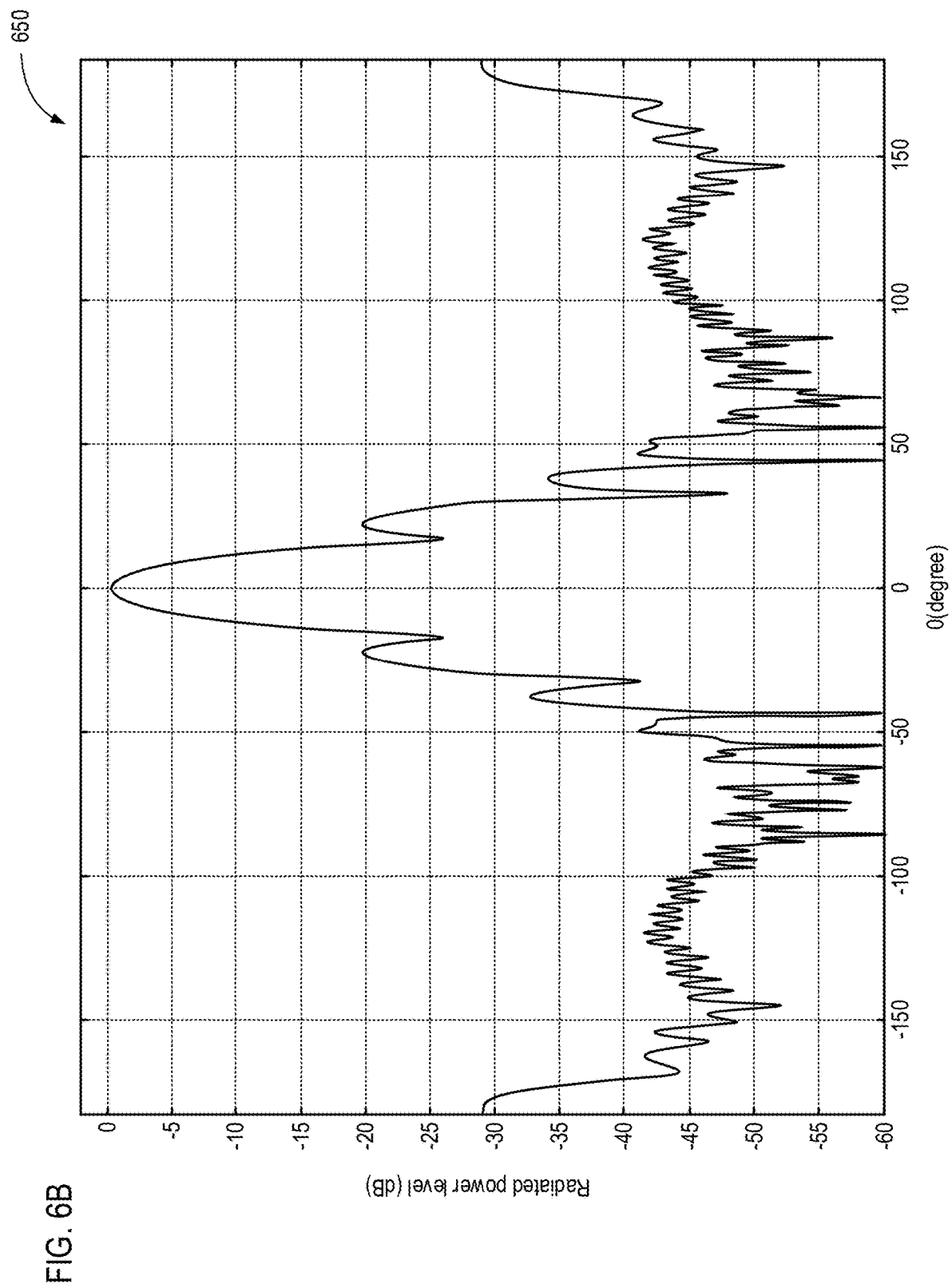
FIG. 6B illustrates an example of a far-field radiation pattern of the two-dimensionally isotropic line source in FIG. 6A surrounded by the mode converting structure having the distribution of refractive indexes shown in FIG. 5.

FIG. 6B illustrates an example of a far-field radiation pattern 650 of the two-dimensionally isotropic line source EMR device surrounded by the mode converting structure having the optimized distribution of dielectric constants shown in FIG. 5. Comparison of FIG. 6A with FIG. 2A and FIG. 6B with FIG. 2B show the improvement in mode conversion efficiency of the optimized solution.

Figure 7:
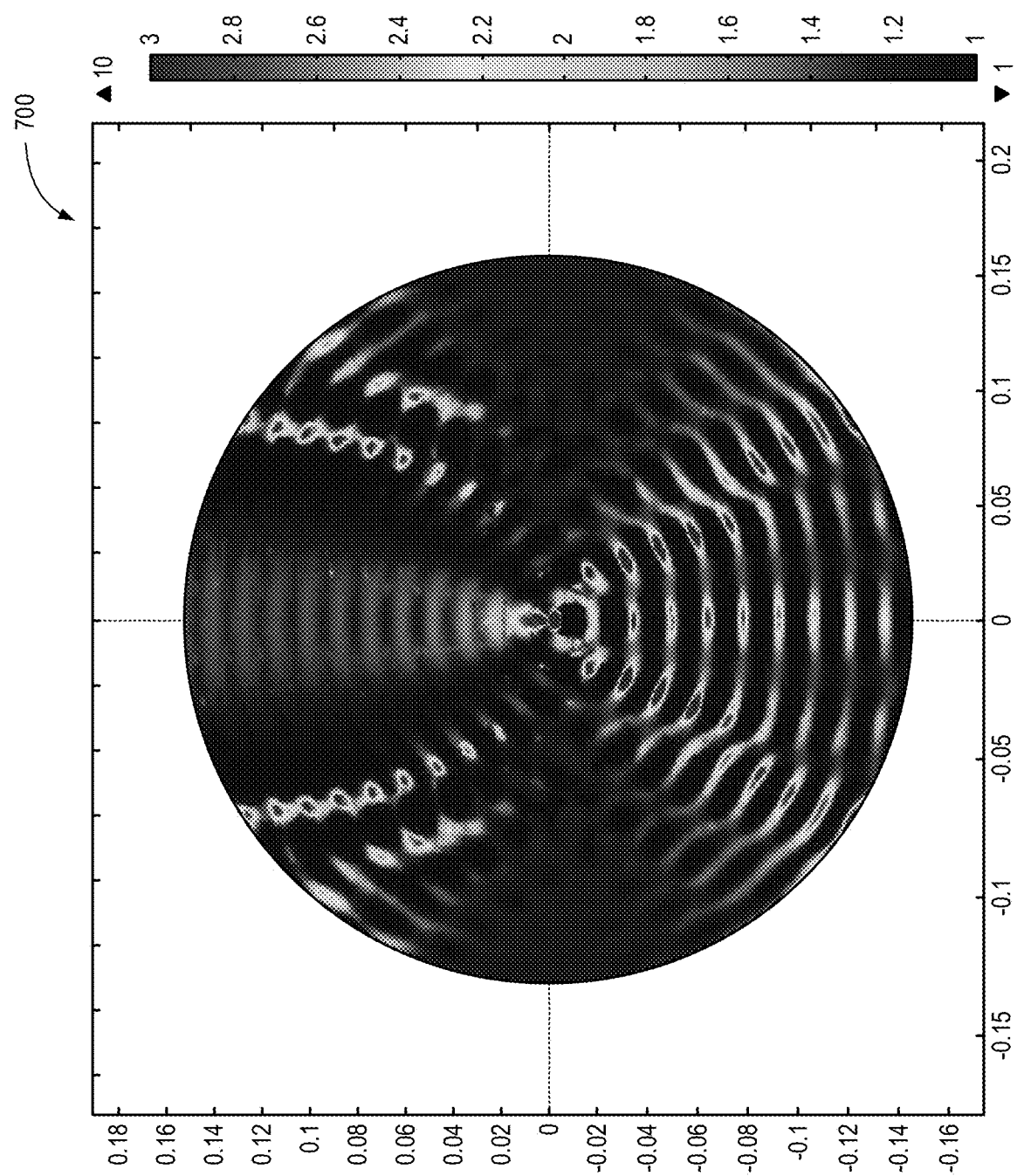
FIG. 7 illustrates an example of an optimized volumetric distribution of refractive indexes generated by optimizing the solution shown in FIG. 3.

FIG. 7 illustrates the optimization 700 of the dielectric constant distribution shown in FIG. 3 using the adjoint sensitivity method and a conjugate-gradient nonlinear solver. In the illustrated optimized dielectric constant distribution, discretized values from FIG. 3 are used as an initial guess. The optimization algorithm converged to the solution shown in FIG. 7.

Figure 8A:
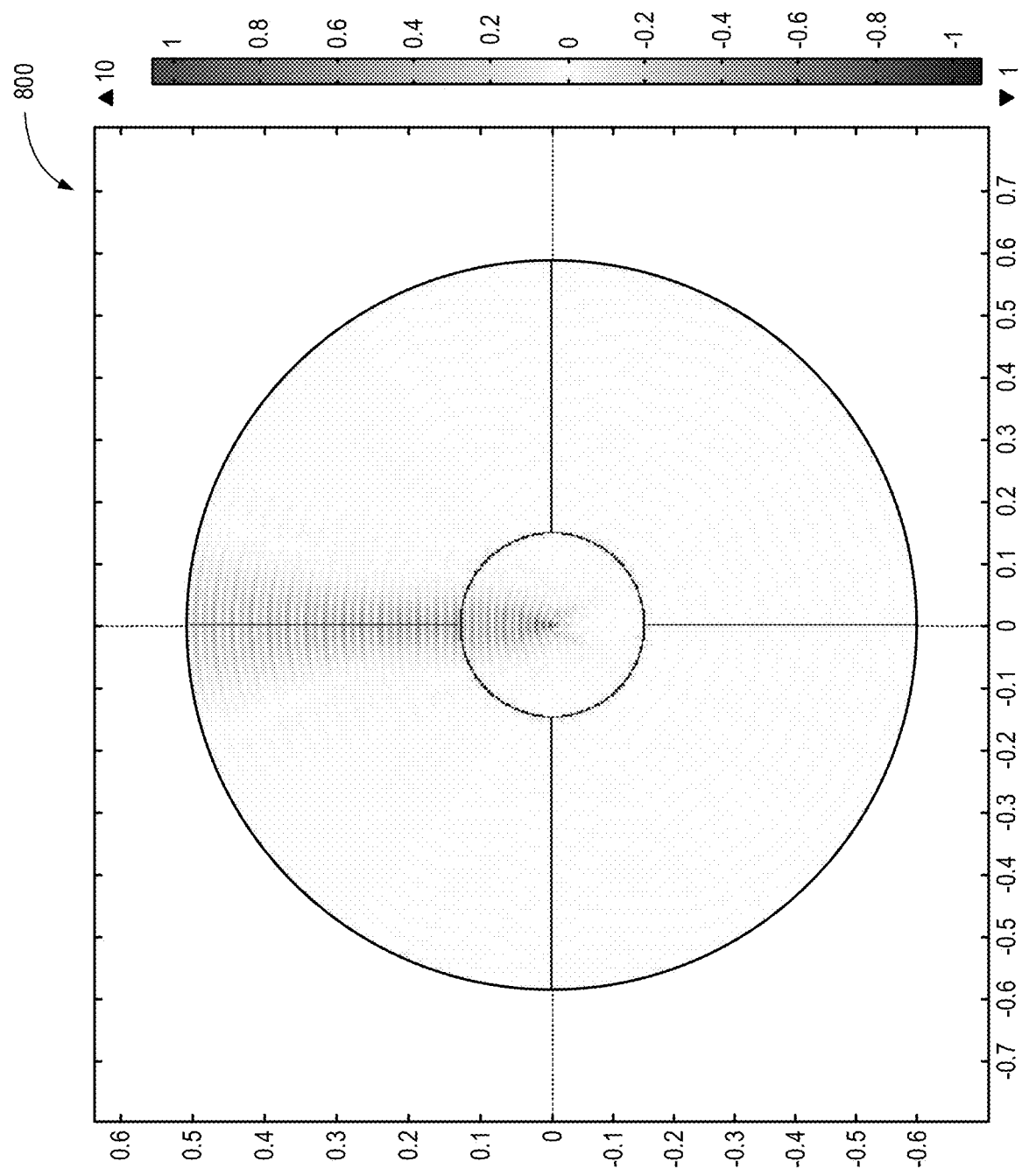
FIG. 8A illustrates an example of a field distribution of the two-dimensional point dipole source surrounded by a mode converting structure that has a distribution of refractive indexes approximating the distribution shown in FIG. 7.

FIG. 8A illustrates an example of a field distribution 800 of the two-dimensional point dipole antenna surrounded by a mode converting structure that has a distribution of dielectric constants approximating the optimized distribution shown in FIG. 7.

Figure 8B:
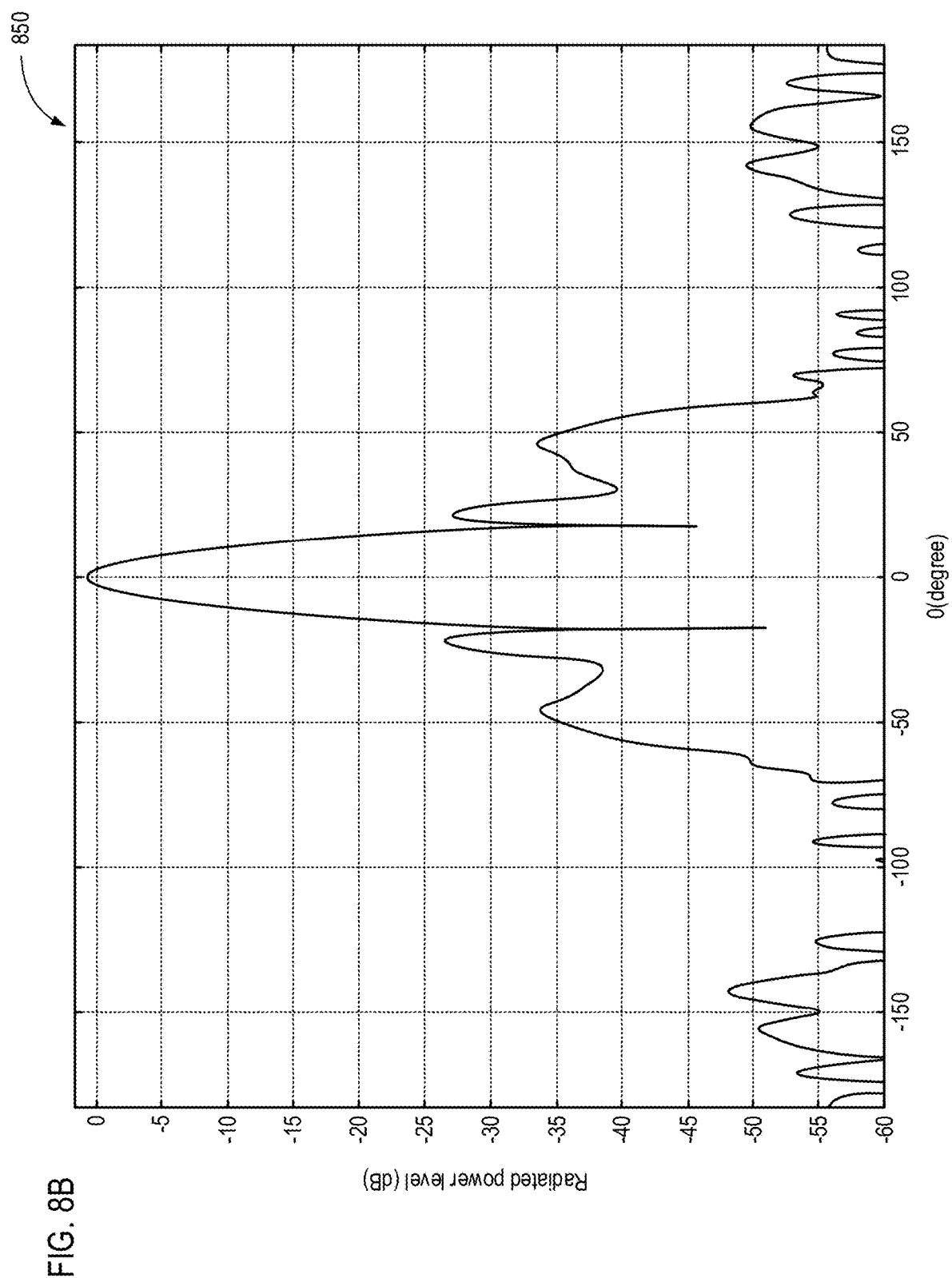
FIG. 8B illustrates an example of a far-field radiation pattern of the two-dimensional point dipole source in FIG. 8A surrounded by the mode converting structure having the distribution of refractive indexes shown in FIG. 7.

FIG. 8B illustrates an example of a far-field radiation pattern 850 of the two-dimensional point dipole antenna in FIG. 8A surrounded by the mode converting structure having the optimized distribution of dielectric constants shown in FIG. 7. Comparison of FIG. 8A with FIG. 4A and FIG. 8B with FIG. 4B show the improvement in mode conversion efficiency of the optimized solution.

The conceptual voxels described above are assigned a discrete permittivity value; however, the total number of unique values is unlimited as each one may be any real (or potentially complex) value. In some embodiments, it may be useful to limit the total number of unique values.

Thus, instead of assigning each voxel a value based on the spatial average, $\varepsilon_{av}$, of the continuous distribution over that region, each voxel could be assigned, as a binary example, one of two values, $\varepsilon_1$ or $\varepsilon_2$. For instance, each voxel may either be assigned a permittivity value of "1" or "X", where 1 represents a vacuum and X represents a permittivity value greater than 1. Such a binary discretization may be thought of as similar to gray-scale imaging where only white and black dithering is used.

The Boolean decision to assign each voxel to either $\varepsilon_1$ or $\varepsilon_2$ may be based on whether $\varepsilon_{av}$ is above or below a threshold value. A similar binary discretization approach may be used for acoustic embodiments, in which a first material having a first acoustic material property value may be used as one type of voxel and a second material having a different acoustic material property value may be used as another type of voxel.

The result may be considered a piecewise-constant distribution of dielectric constants or acoustic material properties. So long as the feature sizes of each voxel are sufficiently small (e.g., sub-wavelength), the mode converting structure may be electromagnetically or acoustically equivalent to a continuous distribution for a given bandwidth of EMR or AR. In various embodiments, the piecewise-constant distribution of dielectric constants or acoustic material properties may be binary, ternary, or quaternary in nature, or otherwise limited to a specific number of unique permittivity values.

Thus, in some embodiments, Equation 1 and/or 2 may be used to determine a continuous distribution of acoustic material properties. Optimization algorithms may then be employed using discretized average acoustic material property values (e.g., acoustic refractive indices. A mode converting structure may then be manufactured using the discretized distribution of optimized average acoustic material properties.

In some embodiments, Equation 1 and/or 2 may be used to determine a continuous distribution of acoustic material properties. Optimization algorithms may then be employed using discretized average acoustic material properties. The discretized average acoustic material properties may then be discretized into N values for an N-ary discretization (where N is 2 for binary discretization, 3 for ternary discretization, and so forth). A mode converting structure may then be manufactured using the discretized distribution of optimized N-ary acoustic material properties. For example, an N-material three-dimensional printer may be used to deposit a material with one of the N acoustic material properties in each respective voxel.

In embodiments in which the piecewise-constant distribution is used in the optimization algorithms, it may be desirable to preserve the ability to use real-valued control variables while still accounting for the N-ary nature of the structures being optimized. An algebraic transformation may be used to map the real-valued control variable to the N-ary-valued dielectric constants. An example of such a transformation for a binary piecewise-constant distribution with permittivity values $\varepsilon_1$ and $\varepsilon_2$ is as follows:

$$\varepsilon(x,y,z)=\varepsilon_1+(\varepsilon_2-\varepsilon_1)\theta_\delta(l(x,y,z)) \qquad \text{Transformation 1}$$

In Transformation 1, l(x,y,z) is a real-valued function of coordinates with values bounded to the [−1; 1] interval (called the level-set function), and $\theta_\delta(l)$ is a smoothed Heaviside function, which, by definition, is equal to zero for l<−δ, unity for l>δ, and is continuous with its first (and possibly second) derivatives for all l. The value of the smoothing parameter δ may be chosen as 0.1; however, this value can be selected differently based on the specific application to achieve more accurate results.

The transformation allows optimization algorithms designed for continuous, real-valued control variables to be used for N-ary discretized approximations by using near-N-ary values as realistic approximations to N-ary values.

After optimization has been performed, the values may be converted back into discretized N-ary values based on whether each optimized value is above or below one or more threshold values, where the number of threshold values is equal to N−1.

In acoustic embodiments in which the piecewise-constant distribution of acoustic material properties is used in the optimization algorithms, it may again be desirable to preserve the ability to use real-valued control variables, while still accounting for the N-ary nature of the structures being optimized. A similar algebraic transformation may be used to map the real-valued control variable to the N-ary-valued acoustic material properties. An example of such a transformation for acoustic refractive indices for a binary piecewise-constant distribution with dynamic compressibility $b_1$ and $b_2$ is as follows:

$$n^2(x,y,z)=b_1+(b_2-b_1)\theta_\delta(l(x,y,z)) \qquad \text{Transformation 1.1}$$

In Transformation 1.1, l(x,y,z) is again a real-valued function of coordinates with values bounded to the [−1; 1] interval, and $\theta_\delta(l)$ is a smoothed Heaviside function. In some embodiments, the value of the smoothing parameter δ is chosen as 0.1. Again, this value can be selected differently based on the specific application to achieve more accurate results.

Figure 9:
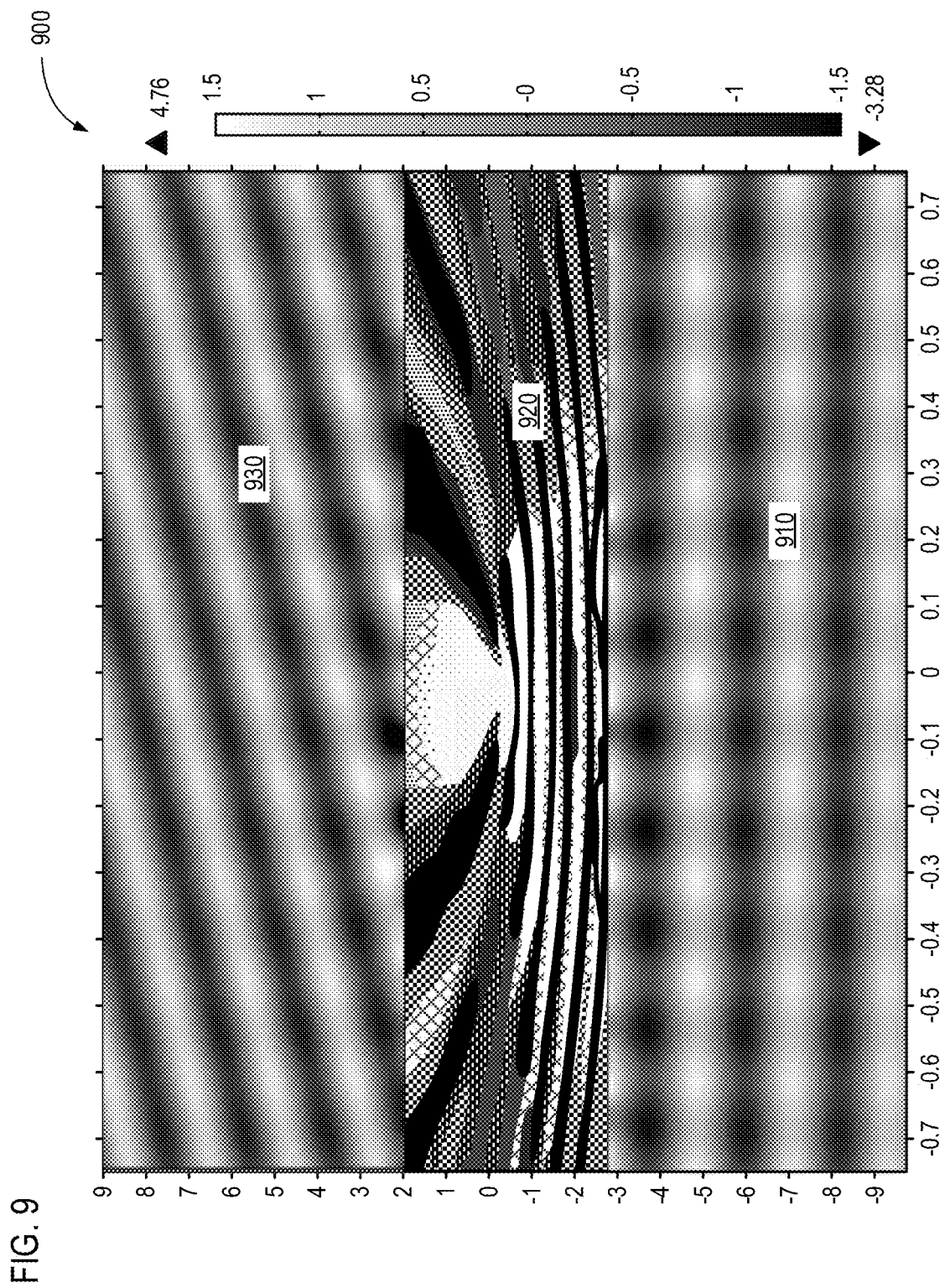
FIG. 9 illustrates an example of an acoustic mode converting structure converting acoustic radiation from a first mode to a second mode.

FIG. 9 illustrates an example 900 of an acoustic mode converting structure 920 converting input acoustic radiation 910 from a first mode and outputting acoustic radiation 930 in a second mode.

Figure 10A:
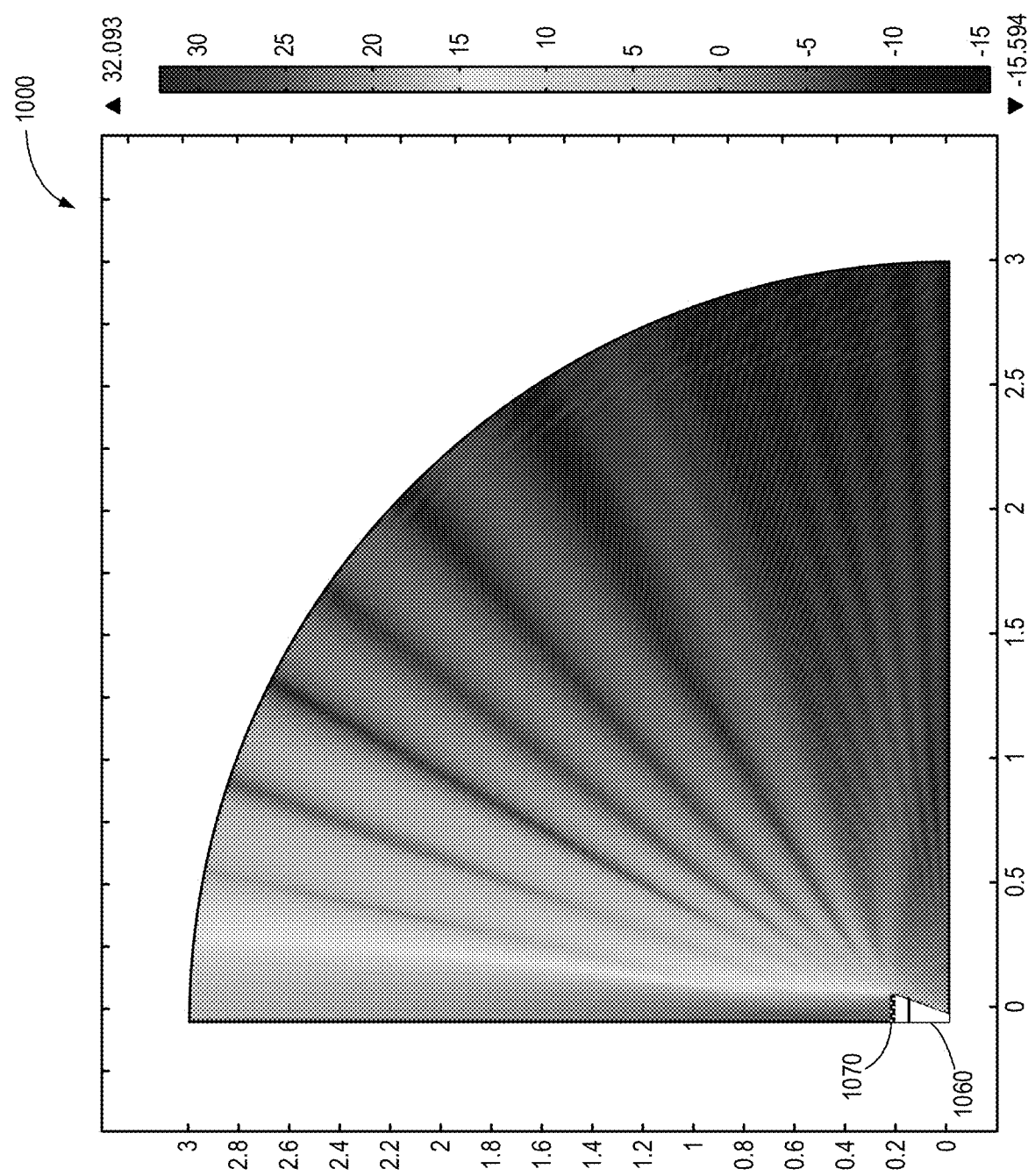
FIG. 10A illustrates an example of an acoustic pressure intensity pattern of a circular ultrasonic horn enhanced with an optimized binary mode converting structure.

FIG. 10A illustrates an example of a radiation intensity pattern 1000 of a circular horn 1060 enhanced with an optimized binary mode converting structure 1070 (i.e., holographic metamaterial).

Figure 10B:
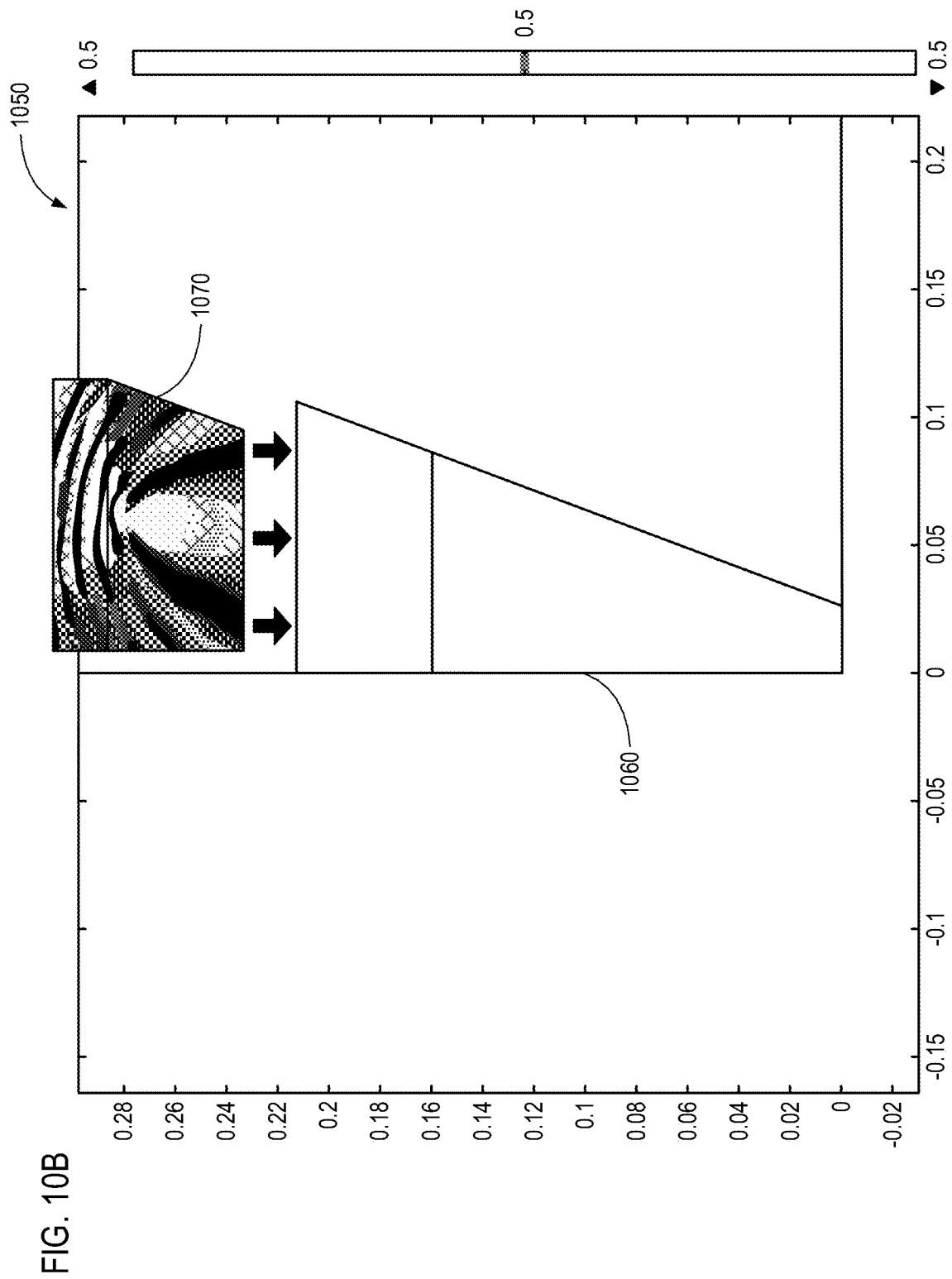
FIG. 10B illustrates an example of a mode converting structure optimized with a binary volumetric distribution of refractive indexes configured to be inserted into the ultrasonic horn.

FIG. 10B illustrates a representation of a mode converting structure 1070 optimized with a binary volumetric distribution of dielectric constants or acoustic material properties configured to be inserted into the horn 1060. The binary volumetric distribution of dielectric constants is illustrated as various grayscale patterns to show that average values over any given region may be a factor of the ratio of voxels assigned $\varepsilon_1$ or $b_1$ (shown as white) and $\varepsilon_2$ or $b_2$ (shown as black). It can be appreciated that for a ternary or other N-ary embodiment, additional colors might be used to represent the various possible discretization alternatives and approximations.

Figure 10C:
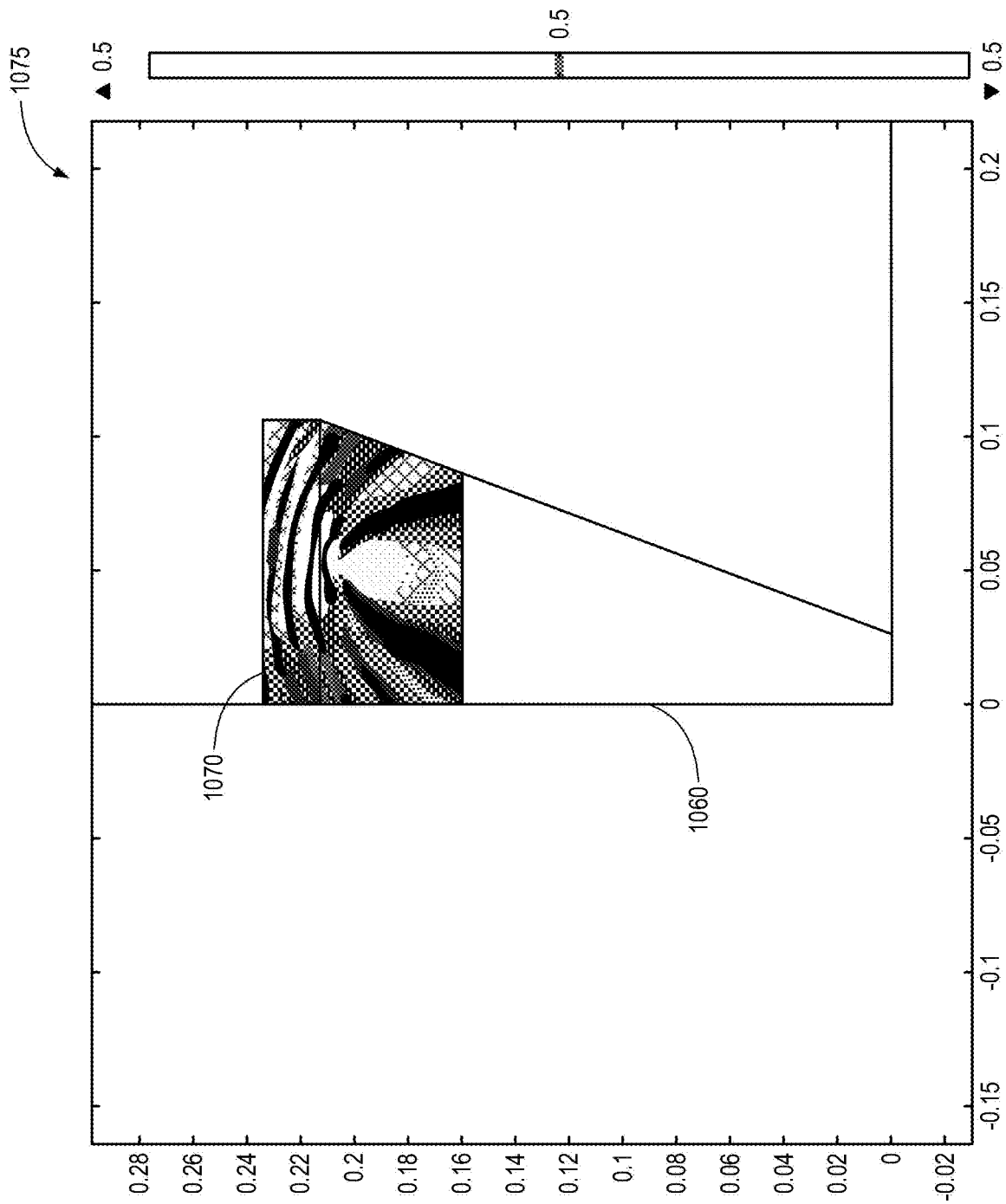
FIG. 10C illustrates the binary optimized mode converting structure inserted into the ultrasonic horn.

FIG. 10C illustrates the binary optimized mode converting structure 1070 inserted into the horn 1060. As illustrated, the mode converting structure 1070 may be specifically manufactured (i.e., a volumetric boundary may be imposed) so that it limits the total width to no wider than the maximum width of the horn 1060. In the illustrated embodiment, the volumetric boundary allows the mode converting structure 970 to protrude from the horn by a small amount.

The equations above describe an x, y, z coordinate system. Many possible variations of Equations 1 and 2 are possible and may be utilized in combination with the discretization and optimization techniques described herein. A variation of Equation 1 that may be used is provided below:

$$n^2_{hol} - 1 = \beta_{goal} \cdot P^*_{in} / |P_{in}|^2 \qquad \text{Equation 3}$$

In Equation 3 above, $n^2_{hol}$ represents a volumetric distribution of acoustic material properties in any of a wide variety of three-dimensional coordinate systems. Similar to Equation 1, $\beta$ represents a normalization constant and $P_{in}$ represents an input pressure field distribution on a mode converting waveguide junction (free space or other transmission medium) or from a device on the surface of the mode converting structure relative to the three-dimensional coordinate system. $P_{goal}$ represents a selected or desired output pressure field distribution from the mode converting structure relative to the three-dimensional coordinate system.

In some embodiments, a variation of Equation 2 may be used as provided below:

$$n^2_{hol} - 1 = \beta |P_{goal} + P_{in}|^2 / |P_{in}|^2 \qquad \text{Equation 4}$$

In Equation 4 above, $n^2_{hol}$ represents a volumetric distribution of dielectric constants in any of a wide variety of three-dimensional coordinate systems. Similar to Equation 1, $\beta$ represents a normalization constant and $P_{in}$ represents an input pressure field distribution on a mode converting waveguide junction, at a waveguide termination, or from an AR device on the surface of the mode converting structure relative to the three-dimensional coordinate system. $P_{goal}$ represents a selected or desired output pressure field distribution from the mode converting structure relative to the three-dimensional coordinate system.

In any of the embodiments described herein, values for $n^2_{hol}$ below a minimum threshold value may be set to a predetermined minimum value. Similarly, values for $n^2_{hol}$ above a maximum threshold value may be set to a predetermined maximum value. In other embodiments, a plurality of discrete values for $n^2_{hol}$ may be available and each of the calculated values of $n^2_{hol}$ may be assigned one of the available discrete values by rounding down to the nearest available value, rounding up to the nearest available value, and/or assigned to the closest matching value.

As previously described, many variations of Equations 1 and 2 may be used to find the holographic solution and calculate the volumetric distribution of dielectric constants. Another example of such an equation is provided below:

$$n^2(x,y,z) = \alpha + \beta P_{goal} \cdot P^*_{in} / |P_{in}|^2 \qquad \text{Equation 5}$$

In Equation 5 above, $n^2$ (x,y,z) represents a volumetric distribution of dielectric constants in an x, y, z coordinate system. $\alpha$ and $\beta$ represent selectable constants and $P_{in}$ represents an input field distribution of radiation from a AR device on the surface of the mode converting structure relative to the x, y, z coordinate system. $P_{goal}$ represents the "goal" or selected/desired output field pressure distribution of radiation from the mode converting structure relative to the x, y, z coordinate system.

It is appreciated, without exhaustive recitation herein, that any of the variations, embodiments, or methods for solving a holographic solution or equation described herein may be used in conjunction with any of the other variations, embodiments, or methods of any other holographic solution or equation.

In Equation 5, a value for a may be selected to optimize impedance matching between the input mode and a mode-converting medium. A value $\alpha$ may be selected to optimize impedance matching between the mode-converting medium and the output mode. A value $\alpha$ may be selected to maintain a minimum value for $n^2_{hol}$, maintain $n^2_{hol}$ greater than 0, or maintain $n^2_{hol}$ greater than 1.

As previously described, the mode converting structure may include one or more metamaterials that have acoustic material properties and/or dielectric constants for a particular frequency range. In some embodiments, physically small metamaterials may be conglomerated to produce a sub-wavelength metamaterial conglomerate with a specific acoustic material property.

In various embodiments, a mode converting structure may be fabricated with a calculated distribution of refractive indexes using one or more of amalgam compounding, material lamination, injection molding processes, extrusion, foaming, compression molding, vacuum forming, blow molding, rotational molding, casting, rotocasting, spin casting, machining, layer deposition, chemical etching, and dip molding. A mode converting structure may be fabricated using one or more of a silica, polymers, glass-forming materials, a metamaterial, porcelain, glass, plastic, air, nitrogen, sulfur hexafluoride, parylene, mineral oil, ceramic, paper, mica, polyethylene, aluminum oxide, and/or other material. Acoustic mode converting structures may include various metals and alloys as useful for a particular application In various embodiments, an initial step may be to identify a target field pattern for an AR device. Dimensional constraints may be identified for a mode converting structure. For example, it may be desirable that the mode converting structure have substantially the same profile or shape as the underlying AR device. As a specific example, it might be desirable that a mode converting structure fit into a cavity of a horn, as shown and described in conjunction with FIGS. 10A-10C above. In another embodiment, it might be desirable that the mode converting structure be configured to replace or supplement an existing transducer. Any of a wide variety of volumetric constraints may be imposed. The mode converting structure can be manufactured to accommodate identified boundaries of a three-dimensional volume.

An input pressure field distribution may be identified that will interact with a surface of the mode converting structure. That is, an input pressure field may be identified at any number of points, planes, or other potential surfaces within the identified three-dimensional boundaries, within which a generated mode converting structure is or may be positioned.

A mode converting structure can be manufactured that has the physical dimensions that fit within the identified three-dimensional volume and a volumetric distribution of acoustic material properties that will convert the field to a second mode that approximates the target pressure field pattern. In some embodiments, the entity that makes the calculations, measurements, identifications, and determinations may be different from the entity that actually manufactures the mode converting structure.

For example, a first entity may provide information to help in identifying the target field pattern, the physical dimensions of a desired mode converting structure, and/or the input field distribution. A second entity may use this provided information to identify the actual target field, input field, and dimensional constraints for the purposes of the calculations. The second entity may then identify (i.e., calculate, estimate, and/or otherwise determine) a volumetric distribution of acoustic material properties.

The volumetric distribution of acoustic material properties may be transmitted to the first party or a third party for manufacture of the mode converting structure. Alternatively, the second party may also manufacture the mode converting structure. In still other embodiments, a single party may perform all of the identification, determination, and manufacturing steps. In short, any number of entities may perform any number of tasks and sub-tasks that aid in the manufacture of a mode converting structure as described herein.

The distribution of acoustic material properties may be a mathematically continuous distribution, may be mathematically/conceptually divided into a piecewise distribution (e.g., for optimization), and/or may be physically divided into a piecewise distribution (e.g., for manufacturing). That is, the mode converting structure may be divided (conceptually and/or actually) into a plurality of sub-wavelength voxels. Each voxel may have one or more dimensions with a maximum dimension that is less than one half-wavelength in diameter for a specific frequency range. Each voxel may be assigned a refractive index (for AR and/or EMR devices), a dielectric constant (for EMR devices) or acoustic material property (for AR devices) based on the determined distribution. Once manufactured, the mode converting structure may convert the radiation from a first mode to a second mode that approximates a target or goal field pattern.

Figure 11A:
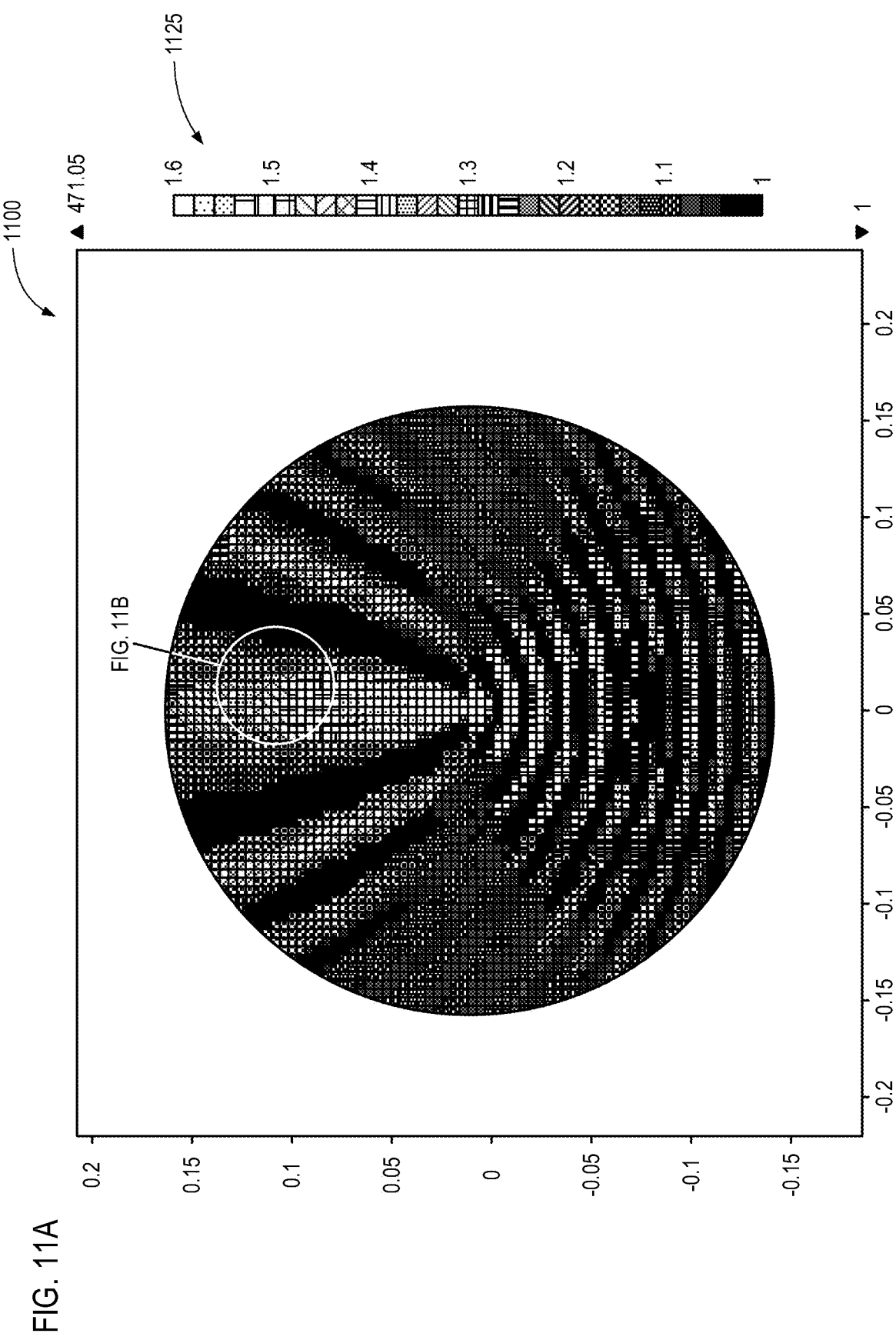
FIG. 11A illustrates a representation of discretization of a volumetric distribution of acoustic material properties into a plurality of discrete acoustic material properties.

FIG. 11A illustrates a representation 1100 of the discretization of the volumetric distribution of acoustic material properties into a plurality of discrete acoustic material properties. In the illustrated embodiment, the grayscale patterns in each of the boxes may each represent one of N discrete acoustic material properties, such as an acoustic refractive index, in which case the voxels are shown as relatively large for illustrative purposes. Alternatively, the grayscale patterns may represent a ratio of underlying binary permittivity values, in which case the individual boxes may represent averaged regions of tens, hundreds, or even thousands of underlying voxels.

That is, FIG. 11A may be thought of as representing the distribution of acoustic material properties discretized into 29 unique values (see legend 1125) with a few hundred voxels in the entire image. Alternatively, legend 1125 may be thought of as representing 29 possible ratios of values in a binary discretization with a few hundred regions shown in the image, in which each region comprises a plurality of underlying voxels whose values have been averaged.

Figure 11B:
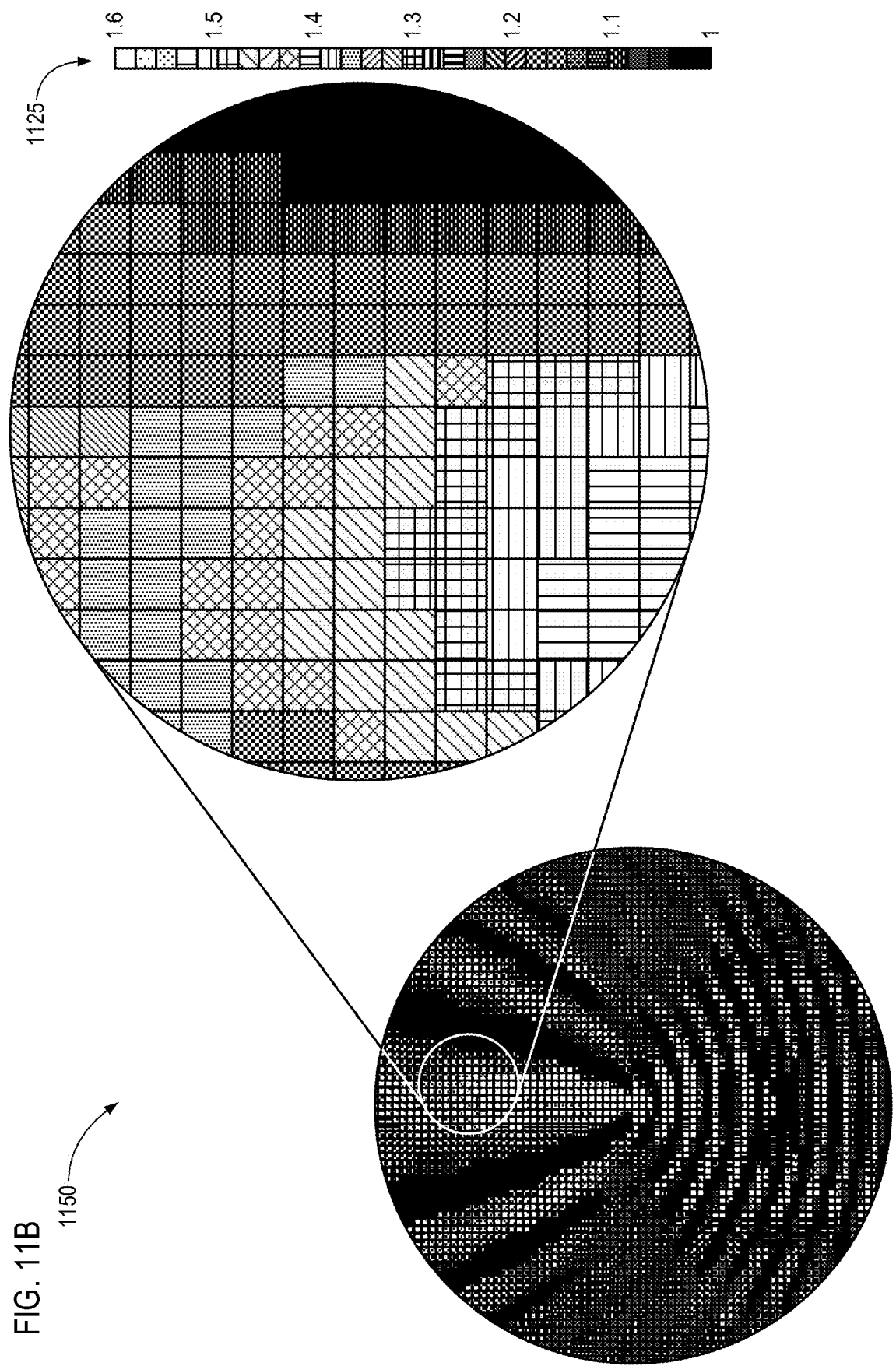
FIG. 11B illustrates a close up view of a portion of FIG. 11A.

FIG. 11B illustrates a close up view 1150 of the representation of individual discrete voxels of the distribution shown in FIG. 11A. Assuming a binary discretization, each square in FIG. 11B may represent an average of many underlying voxels.

Figure 11C:
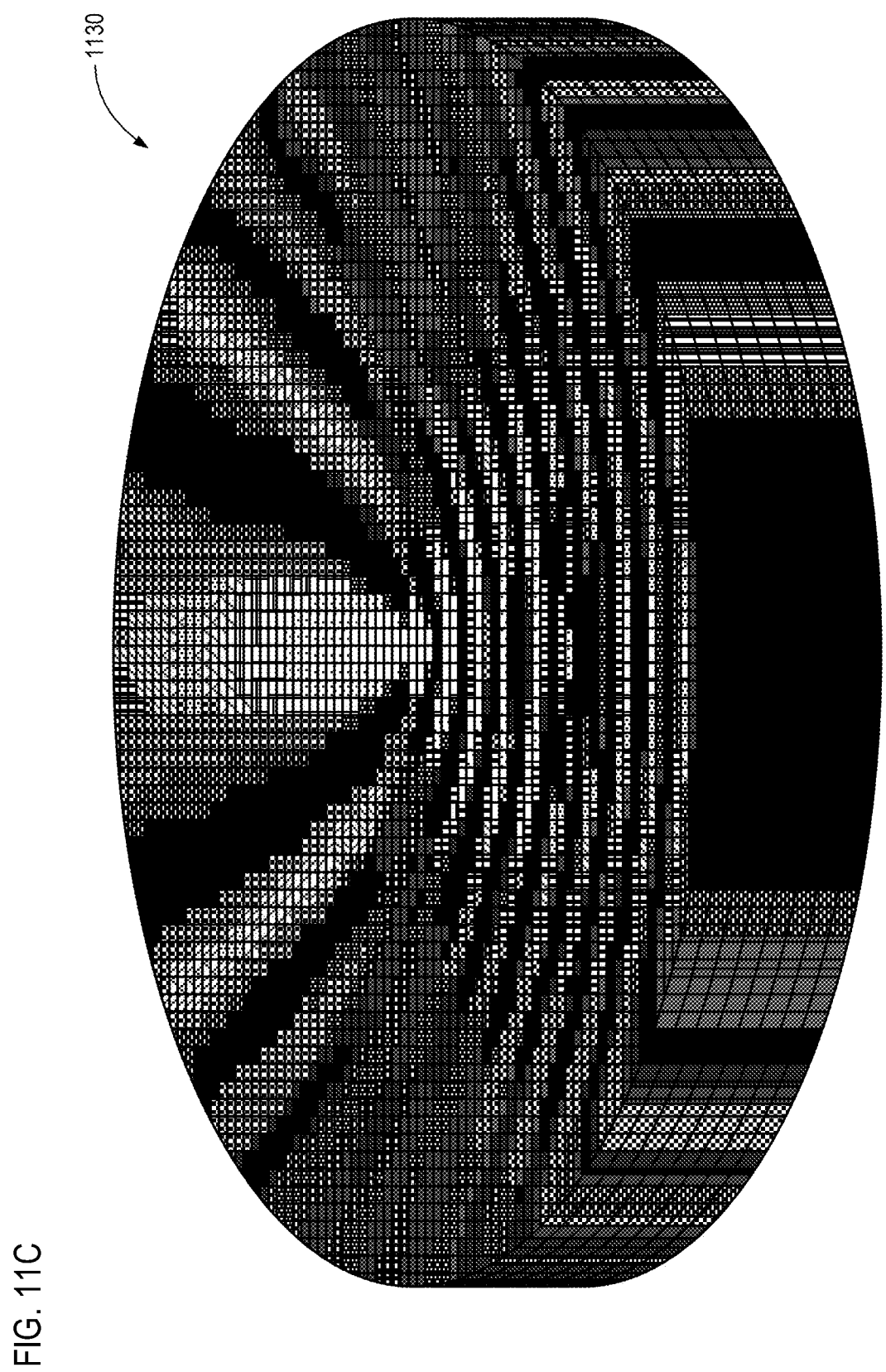
FIG. 11C illustrates a representation of a possible embodiment of a cylindrical mode converting structure with individual voxels assigned discrete acoustic material properties.

FIG. 11C illustrates a representation of a possible embodiment of a cylindrical mode converting structure 1130 with individual voxels assigned discrete acoustic material property values.

Figure 12:
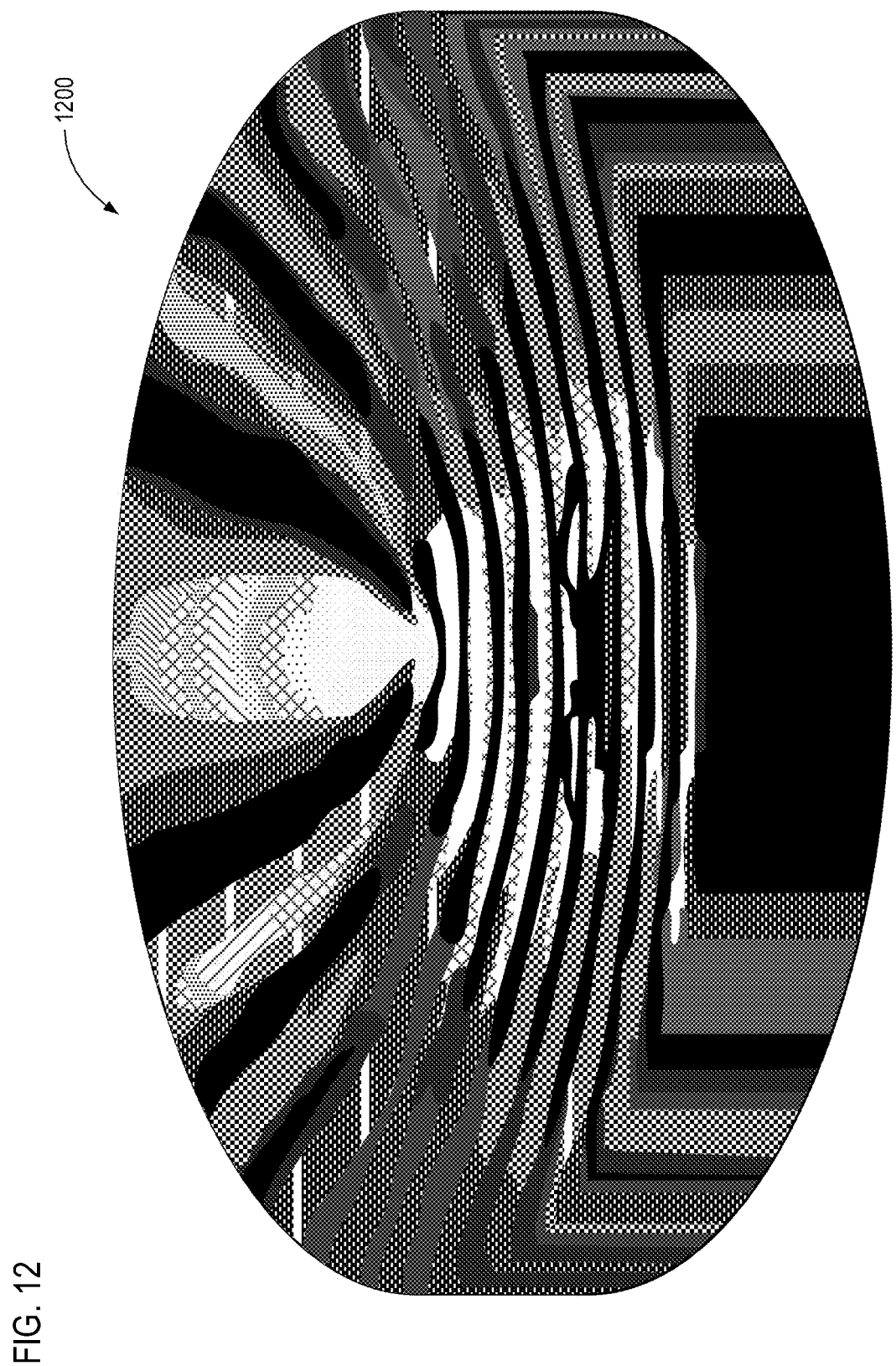
FIG. 12 illustrates a representation of the effective distribution of acoustic material properties of the mode converting structure for voxels with sub-wavelength dimensions.

FIG. 12 illustrates a representation of the effective distribution of acoustic material properties of the mode converting structure of FIG. 11C for voxels with sub-wavelength dimensions. As illustrated, if the feature sizes of each voxel are small enough, the discretized distribution of acoustic material properties closely approximates and may, for purposes of a given bandwidth of an AR device, be functionally equivalent to a continuous distribution of acoustic material properties. However, for the implementation of optimization algorithms and/or to facilitate in the manufacturing process, it may be beneficial to discretize the distribution of acoustic material properties to include N discrete values, where N is selected based on the manufacturing technique employed, the number of available materials with unique acoustic material properties, and/or the homogenous or heterogeneous nature of such materials.

One method of generating the mode converting structure comprises using a three-dimensional printer to deposit one or more materials having unique acoustic material properties. As described above, each voxel may be assigned an acoustic material properties based on the calculated distribution of acoustic material properties. The three-dimensional printer may be used to "fill" or "print" a voxel with a material corresponding to (perhaps equal to or approximating) the assigned acoustic material property.

Three-dimensional printing using multiple materials may allow for various refractive indexes to be printed. In other embodiments, spaces or voids may be formed in which no material is printed. The spaces or voids may be filled with a fluid or a vacuum, or ambient fluid(s) may enter the voids (e.g., air).

In some embodiments, a multi-material three-dimensional printer may be used to print each voxel using a mixture or combination of the multiple materials. The mixture or combination of multiple materials may be printed as a homogeneous or heterogeneous mixture. In embodiments in which a homogeneous mixture is printed, the printer resolution may be approximately equal to the voxel size. In embodiments in which a heterogeneous mixture is printed, the printer resolution may be much smaller than the voxel size and each voxel may be printed using a combination of materials whose average acoustic material properties approximates the assigned acoustic material property for the particular voxel.

In some embodiments, the mode converting structure may be divided into a plurality of layers. Each of the layers may then be manufactured individually and then joined together to form the complete mode converting structure. Each layer may, in some embodiments, be formed by removing material from a plurality of voxels in a solid planar layer of material having a first acoustic material property value.

The removed voxels may then be filled with material(s) having one or more different acoustic material property values. In some embodiments, the mode converting structure may be rotationally symmetrical such that it can be manufactured by creating a first planar portion and rotating it about an axis.

As described above, a binary discretization may result in a plurality of voxels, each of which is assigned one of two possible permittivity values. The resolution and size of the voxels selected may be based on the wavelength size of the frequency range being used.

Any of a wide variety of materials and methods of manufacturing may be employed. For example, a mode converting structure may be manufactured, at least in part, using glass-forming materials, polymers, metamaterials, aperiodic photonic crystals, silica, composite metamaterials, porous materials, foam materials, layered composite materials, stratified composite materials, fiber-bundle materials, micro-rod materials, nano-rod materials, a non-superluminal low-loss dielectric material, porcelain, glass, plastic, air, nitrogen, iron, steel, aluminum, copper, other metals, alloys, sulfur hexafluoride, parylene, mineral oil, ceramic, paper, mica, polyethylene, and aluminum oxide.

The mode converting structure may be fabricated by heating a material above a glass transition temperature and extruding a molten form of the material through a mask. The mask may be a rigid mask. Any other fabrication method or combination of fabrication techniques may be used, including injection molding, chemical etching, chemical deposition, heating, ultrasonication, and/or other fabrication techniques known in the art.

Figure 13:
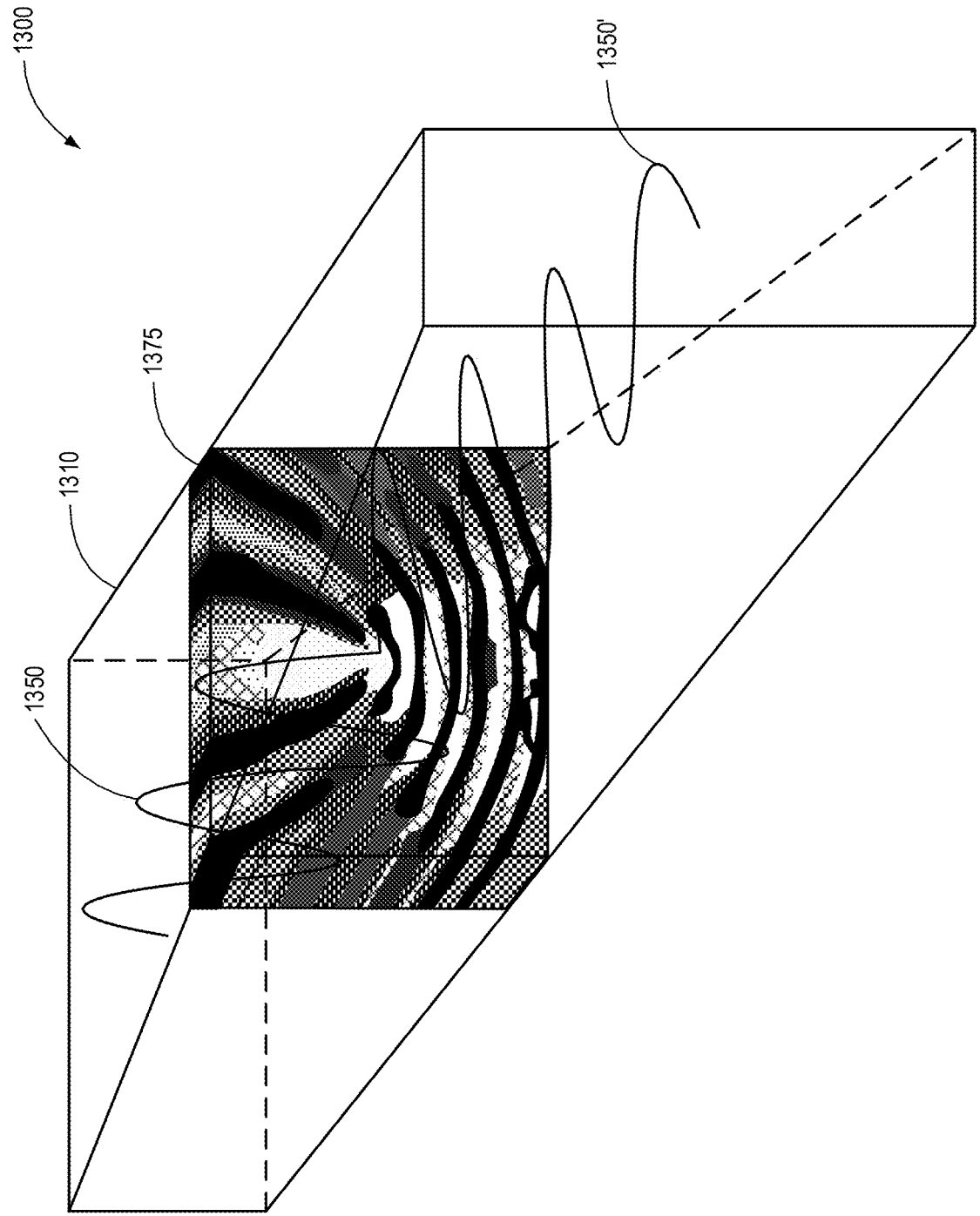
FIG. 13 illustrates one embodiment of a representation of a mode converting structure within a first waveguide configured to convert ultrasonic energy from a first mode to a second mode.

In FIG. 13, the illustrated grayscale shading of the mode converting structure 1375 is for illustrative purposes only and does not correspond to a useful distribution of acoustic material properties and is not intended to represent an actual or even plausible distribution of acoustic material properties. Actual dimensions and distributions of acoustic material properties can be calculated and/or optimized using the various algorithms, methods, and approaches described herein.

FIG. 13 illustrates one embodiment 1300 of a mode converting structure 1375 within a first waveguide or transmission medium 1310 configured to convert radiation from a first mode 1350 to a second mode 1350'. The mode converting structure 1375 may be said to couple a first medium with radiation in the first mode 1350 and a second medium with radiation in the second mode 1350'. Alternatively, the mode converting structure 1375 may be described as an insert or component within a single waveguide or as separating two mediums. As illustrated, the first portion of the waveguide (or first waveguide or first medium) with the radiation in the first mode 1350 may have different dimensions than the second portion of the waveguide (or second waveguide or second medium) in the second mode 1350'.

FIG. 14 illustrates a simulated embodiment 1401 of ultrasound in a first mode 1450. A mode converting structure 1475 converts the ultrasound from the first mode 1450 in the first waveguide 1410 to ultrasound in a second mode 1450' in the second waveguide 1420.

Many existing computing devices and infrastructures may be used in combination with the presently described systems and methods. Some of the infrastructure that can be used with embodiments disclosed herein is already available, such as general-purpose computers, computer programming tools and techniques, digital storage media, and communication links. A computing device or controller may include a processor, such as a microprocessor, a microcontroller, logic circuitry, or the like. A processor may include a special purpose processing device, such as application-specific integrated circuits (ASIC), programmable array logic (PAL), programmable logic array (PLA), programmable logic device (PLD), field programmable gate array (FPGA), or other customizable and/or programmable device. The computing device may also include a machine-readable storage device, such as non-volatile memory, static RAM, dynamic RAM, ROM, CD-ROM, disk, tape, magnetic, optical, flash memory, or other machine-readable storage medium. Various aspects of certain embodiments may be implemented using hardware, software, firmware, or a combination thereof.

The components of the disclosed embodiments, as generally described and illustrated in the figures herein, could be arranged and designed in a wide variety of different configurations. Furthermore, the features, structures, and operations associated with one embodiment may be applicable to or combined with the features, structures, or operations described in conjunction with another embodiment. In many instances, well-known structures, materials, or operations are not shown or described in detail to avoid obscuring aspects of this disclosure.

The embodiments of the systems and methods provided within this disclosure are not intended to limit the scope of the disclosure, but are merely representative of possible embodiments. In addition, the steps of a method do not necessarily need to be executed in any specific order, or even sequentially, nor do the steps need to be executed only once. As described above, descriptions and variations described in terms of transmitters are equally applicable to receivers, and vice versa.

This disclosure has been made with reference to various exemplary embodiments, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. The scope of the present invention should, therefore, be determined by the following claims.

What is claimed is:

1. A method for manufacturing a mode converting structure comprising a holographic metamaterial that, when positioned relative to an acoustic radiation device (AR), modifies an acoustic field profile of the AR device from an input mode to an output mode, the method comprising:
    identifying a target radiation pattern for the AR device for a finite frequency range;
    identifying boundaries of a three-dimensional volume to enclose a mode converting structure relative to the AR device;
    identifying an input pressure field distribution of acoustic radiation on a surface of the mode converting structure from the AR device;
    identifying a volumetric distribution of acoustic material properties within the mode converting structure to transform the input pressure field distribution of acoustic radiation in an input mode to an output field distribution of acoustic radiation that approximates the target radiation pattern in an output mode; and
    manufacturing the mode converting structure using the identified volumetric distribution of acoustic material properties.

2. The method of claim 1, wherein identifying the volumetric distribution of acoustic material properties comprises identifying a volumetric distribution of material properties including components of linear elasticity tensor and dynamic density tensor in a selected coordinate system.

3. The method of claim 1, wherein identifying the volumetric distribution of acoustic material properties comprises identifying an acoustic material property combination to modify an acoustic field profile to achieve a target far-field radiation pattern.

4. The method of claim 3, wherein the acoustic material property combination includes a combination of components of linear elasticity tensor and dynamic density tensor.

5. The method of claim 1, wherein the identifying the volumetric distribution of acoustic material properties comprises identifying an acoustic material property combination to modify an acoustic field profile to achieve a target near-field radiation pattern.

6. The method of claim 5, wherein the acoustic material property combination includes a combination of components of linear elasticity tensor and dynamic density tensor.

7. The method of claim 1, further comprising:
assigning each of a plurality of unique acoustic material properties to a corresponding subset of voxels.

8. The method of claim 7, further comprising:
forming each voxel of the subset of voxels from a material having a unique bulk modulus, such that each of the voxels in the subset of voxels has a unique acoustic material property based on the unique bulk modulus of the material from which the voxel is formed.

9. The method of claim 7, further comprising:
forming each voxel of the subset of voxels from a material having a unique elastic modulus, such that each of the voxels in the subset of voxels has a unique acoustic material property based on the unique elastic modulus of the material from which the voxel is formed.

10. The method of claim 7, further comprising:
forming each voxel of the subset of voxels from a material having a unique density, such that each of the voxels in the subset of voxels has a unique acoustic material property based on the unique density of the material from which the voxel is formed.

11. The method of claim 7, further comprising:
forming each voxel of the subset of voxels from a material having a unique acoustic characteristic, such that each of the voxels in the subset of voxels has a unique acoustic material property based on a unique acoustically-relevant quality of the material from which the voxel is formed.

12. The method of claim 11, wherein the unique acoustic characteristic of the material comprises at least two of: a density of the material, an elastic modulus of the material, and a bulk modulus of the material.

13. The method of claim 11, wherein the unique acoustic characteristic of the material comprises a combination of a density of the material, an elastic modulus of the material, and a bulk modulus of the material.

14. The method of claim 1, wherein the volumetric distribution is approximately homogeneous in one spatial dimension in a coordinate system, such that the volumetric distribution of the mode converting structure is effectively two-dimensional.

15. The method of claim 14, wherein the coordinate system is Cartesian, such that the volumetric distribution corresponds to a uniform extrusion of a planar two-dimensional distribution perpendicular to its plane.

16. The method of claim 14, wherein the coordinate system is cylindrical, such that the volumetric distribution corresponds to a uniform rotation of a two-dimensional planar cross section around a selected axis of revolution.

17. The method of claim 1, wherein the mode converting structure is configured to be positioned on an end of an acoustic transmission line of the AR device.

18. The method of claim 17, wherein the mode converting structure is configured to convert from a first mode that is associated with an acoustic transmission along the acoustic transmission line to a second mode that is a free-space acoustic radiation mode.

19. The method of claim 17, wherein the mode converting structure is configured to convert from a first mode that is associated with free-space acoustic radiation to a second mode for acoustic transmission along the acoustic transmission line of the AR device.

20. The method of claim 1, wherein identifying the volumetric distribution of acoustic material properties comprises identifying a first subset of voxels to be formed from a first material having a first acoustic characteristic and a second subset of voxels to be formed from a second material having a second acoustic characteristic that is different from the first acoustic characteristic.

21. The method of claim 1, wherein identifying the volumetric distribution of acoustic material properties comprises: identifying the volumetric distribution of acoustic material properties for standard ambient temperature pressure (SATP) as a first subset of voxels to be formed from a first, solid material having a first acoustic characteristic and a second subset of voxels to be formed from a second, liquid material having a second acoustic characteristic that is different from the first acoustic characteristic.

22. The method of claim 1, wherein identifying the volumetric distribution of acoustic material properties comprises selecting a volumetric distribution of primary acoustic refractive indices that corresponds to a holographic solution.

23. The method of claim 1, wherein the target radiation pattern is configured to narrow a far-field beamwidth of the main lobe of the AR device.

24. The method of claim 1, wherein the target radiation pattern is configured to increase a directional gain of the AR device.

25. The method of claim 1, wherein the target radiation pattern is configured for creating at least one deep minimum or null in a far-field directivity pattern.

26. The method of claim 1, wherein the target radiation pattern configured for modifying a direction in which a null in a far-field would occur with a unmodified AR device.

27. The method of claim 1, wherein the target radiation pattern is configured to decrease far-field sidelobes of the AR device.

28. The method of claim 1, wherein the target radiation pattern is configured to decrease a maximum sidelobe level.

29. The method of claim 1, wherein the target radiation pattern is configured to decrease a directivity in at least one direction.

30. The method of claim 1, wherein the target radiation pattern is configured to decrease a power level of at least one sidelobe.

31. The method of claim 1, wherein the target radiation pattern is configured to decrease power radiated into a specific solid angle.

32. The method of claim 1, wherein the target radiation pattern is configured to change a direction of a strongest sidelobe.

33. The method of claim 1, wherein the target radiation pattern is configured to change a direction of a sidelobe closest to a boresight.

34. The method of claim 1, wherein the target radiation pattern is configured to decrease radiation in an approximately opposite direction of a main lobe direction.

35. The method of claim 1, wherein the target radiation pattern is configured to decrease radiation in a backward half space defined as a direction between approximately 180 and 270 degrees relative to the boresight.

36. The method of claim 1, wherein the target radiation pattern is configured to increase a uniformity of the radiation profile of the AR device in the near-field.

37. The method of claim 1, wherein the target radiation pattern is configured to create a null in a near-field of the AR device.

38. The method of claim 1, wherein the target radiation pattern is configured to create a concentration of acoustic energy density in the near-field of the AR device.

39. The method of claim 1, wherein the target radiation pattern is configured to reduce peak values of an acoustic field in the near-field of the AR device.

40. The method of claim 1, wherein the target radiation pattern is configured to modify a far-field radiation pattern to compensate for a re-radiating object positioned in a reactive or radiative near-field of the AR device.

41. The method of claim 1, wherein manufacturing comprises:
fabricating the mode converting structure by heating a material above a glass transition temperature and extruding a molten form of the material through a mask.

42. The method of claim 41, wherein the mask comprises a rigid mask.

43. The method of claim 1, wherein manufacturing comprises:
fabricating the mode converting structure using injection molding of a forming material, and removing mold material after solidification of the forming material.

44. The method of claim 1, wherein manufacturing comprises depositing, using a three-dimensional printer, one or more materials having different acoustic material properties using the identified volumetric distribution of acoustic material properties.

* * * * *